United States Patent
Dunlap et al.

(10) Patent No.: US 10,480,601 B2
(45) Date of Patent: Nov. 19, 2019

(54) HEAT DISSIPATING BRAKE ROTOR

(71) Applicant: SRAM, LLC, Chicago, IL (US)

(72) Inventors: Charles Dunlap, Manitou Springs, CO (US); Braden Snead, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 15/252,933

(22) Filed: Aug. 31, 2016

(65) Prior Publication Data

US 2017/0370431 A1 Dec. 28, 2017

Related U.S. Application Data

(63) Continuation-in-part of application No. 15/189,815, filed on Jun. 22, 2016.

(51) Int. Cl.
*F16D 65/12* (2006.01)
*F16D 65/02* (2006.01)

(52) U.S. Cl.
CPC ......... *F16D 65/128* (2013.01); *F16D 65/123* (2013.01); *F16D 65/125* (2013.01); *F16D 2065/136* (2013.01); *F16D 2065/1316* (2013.01); *F16D 2065/1392* (2013.01); *F16D 2200/003* (2013.01); *F16D 2200/0021* (2013.01); *F16D 2200/0026* (2013.01)

(58) Field of Classification Search
CPC ...... F16D 65/12; F16D 65/123; F16D 65/125; F16D 65/128
USPC ........ 188/18 A, 26, 218 XL, 264 A, 264 AA
See application file for complete search history.

(56) References Cited

U.S. PATENT DOCUMENTS

| | | | |
|---|---|---|---|
| 526,317 | A | 9/1894 | Hendrick |
| 3,680,663 | A | 8/1972 | Kine et al. |
| 4,636,675 | A | 1/1987 | Takahashi |
| 6,079,611 | A | 6/2000 | Nakamura et al. |
| 6,164,421 | A | 12/2000 | Nakamura et al. |
| 6,349,800 | B1 | 2/2002 | Nakamura |
| 6,880,683 | B1 | 4/2005 | Miles |
| 7,424,938 | B2 | 9/2008 | Takizawa |
| 8,522,931 | B2 | 9/2013 | Souwa et al. |

(Continued)

FOREIGN PATENT DOCUMENTS

| | | |
|---|---|---|
| CN | 1270906 | 10/2000 |
| CN | 100453399 | 1/2009 |

(Continued)

OTHER PUBLICATIONS

"Jagwire", Jagwire Warms up to Disc Brakes w/ New Finned Cooling Rotors, available at http://www.bikerumor.com.

*Primary Examiner* — Christopher P Schwartz

(57) ABSTRACT

A brake rotor for a bicycle has a brake body formed of a first material and a cooling element with a cooling body, at least part of which is formed of a second material that has a higher thermal conductivity than the first material. The brake body has a generally annular shape with a first axial contact surface. The cooling body is coupled to the first axial contact surface. The cooling body may be in contact with the first axial contact surface around the brake body for a majority of a circumference of the heat dissipation region. The cooling body may be attached to or be an integral part of a carrier coupled to the brake body. The cooling body may include a protrusion.

26 Claims, 24 Drawing Sheets

(56) References Cited

U.S. PATENT DOCUMENTS

| | | | | |
|---|---|---|---|---|
| 8,684,149 B2* | 4/2014 | Mueller | ................ | F16D 65/123 188/18 A |
| 8,813,921 B2* | 8/2014 | Iwai | ................ | B60T 7/102 188/218 XL |
| 9,194,447 B2* | 11/2015 | Kirkpatrick | ............. | F16D 65/12 |
| 9,593,727 B1* | 3/2017 | Nakakura | ............. | F16D 65/128 |
| 2001/0030094 A1 | 10/2001 | Pareti | | |
| 2002/0179199 A1 | 12/2002 | Weng et al. | | |
| 2006/0037819 A1 | 2/2006 | Takizawa | | |
| 2007/0181390 A1 | 8/2007 | Korm | | |
| 2010/0282551 A1* | 11/2010 | Ruopp | ................ | F16D 65/123 188/218 XL |
| 2011/0240420 A1* | 10/2011 | Souwa | ................ | F16D 65/12 188/218 XL |
| 2012/0000736 A1* | 1/2012 | Koshiyama | ........... | F16D 65/847 188/71.6 |
| 2012/0111674 A1* | 5/2012 | Moore | ................ | F16D 65/12 188/218 XL |
| 2012/0222926 A1 | 9/2012 | Iwai et al. | | |
| 2013/0092485 A1* | 4/2013 | Moore | ................ | F16D 65/12 188/218 XL |
| 2013/0133997 A1* | 5/2013 | Iwai | ................ | B60T 7/102 188/218 XL |
| 2013/0168193 A1* | 7/2013 | Iwai | ................ | F16D 65/12 188/218 XL |
| 2013/0240309 A1* | 9/2013 | Moore | ................ | F16D 65/12 188/218 XL |
| 2013/0284549 A1 | 10/2013 | Rudoy et al. | | |
| 2015/0167763 A1* | 6/2015 | Kleber | ................ | F16D 65/123 188/218 XL |
| 2015/0345579 A1* | 12/2015 | Iwai | ................ | F16D 65/12 188/26 |
| 2016/0102719 A1* | 4/2016 | Watarai | ................ | F16D 65/128 188/218 XL |
| 2017/0370430 A1* | 12/2017 | Dunlap | ................ | F16D 65/128 |

FOREIGN PATENT DOCUMENTS

| | | | | |
|---|---|---|---|---|
| CN | 102207142 | | 10/2011 | |
| DE | 29610469 U1 | | 10/1997 | |
| DE | 19963031 C1 | | 5/2001 | |
| DE | 202016103056 | * | 8/2016 | ............ F16D 65/12 |
| EP | 1847452 A2 | | 10/2007 | |
| EP | 2060822 A1 | | 5/2009 | |
| JP | 2003278810 A | | 10/2003 | |

* cited by examiner

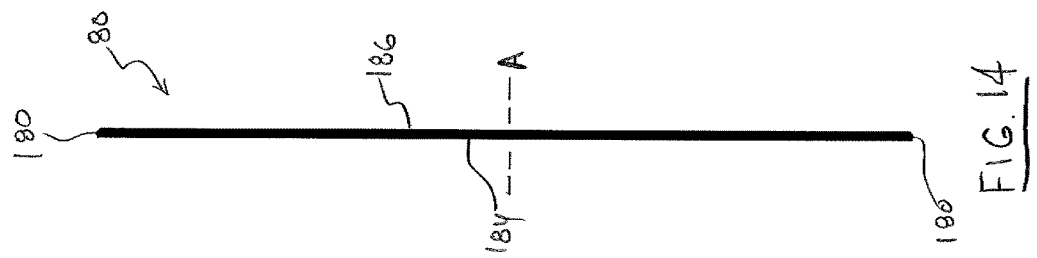
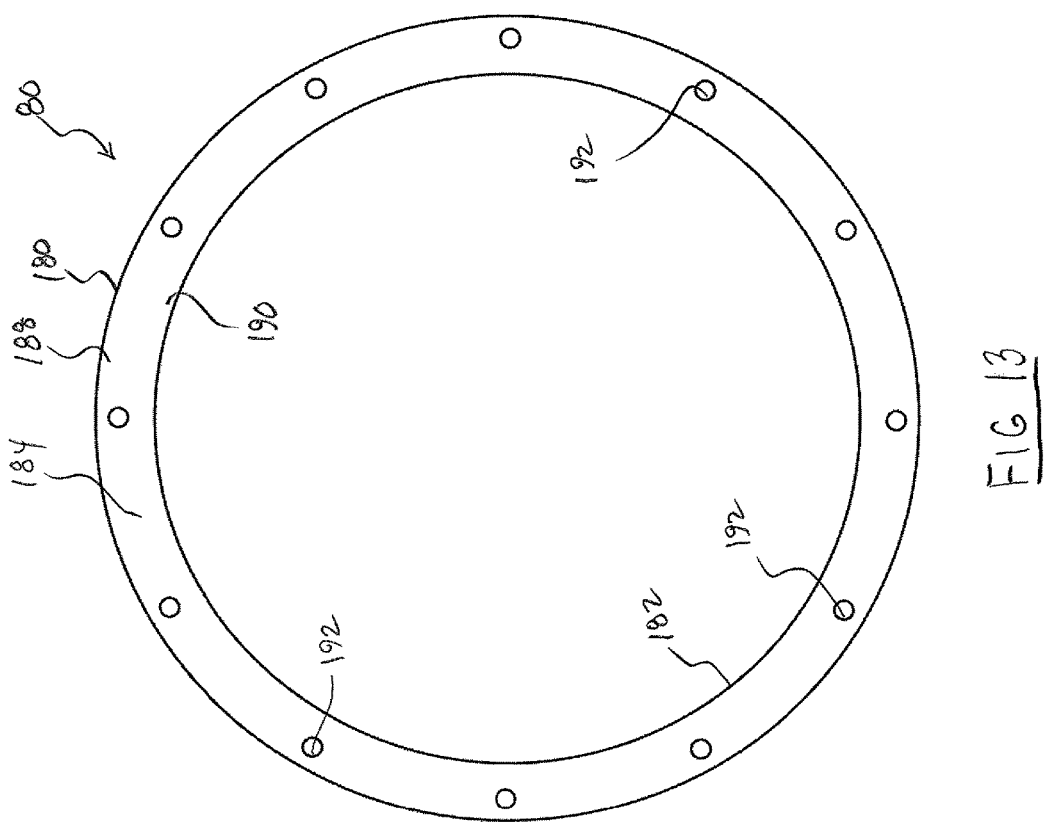

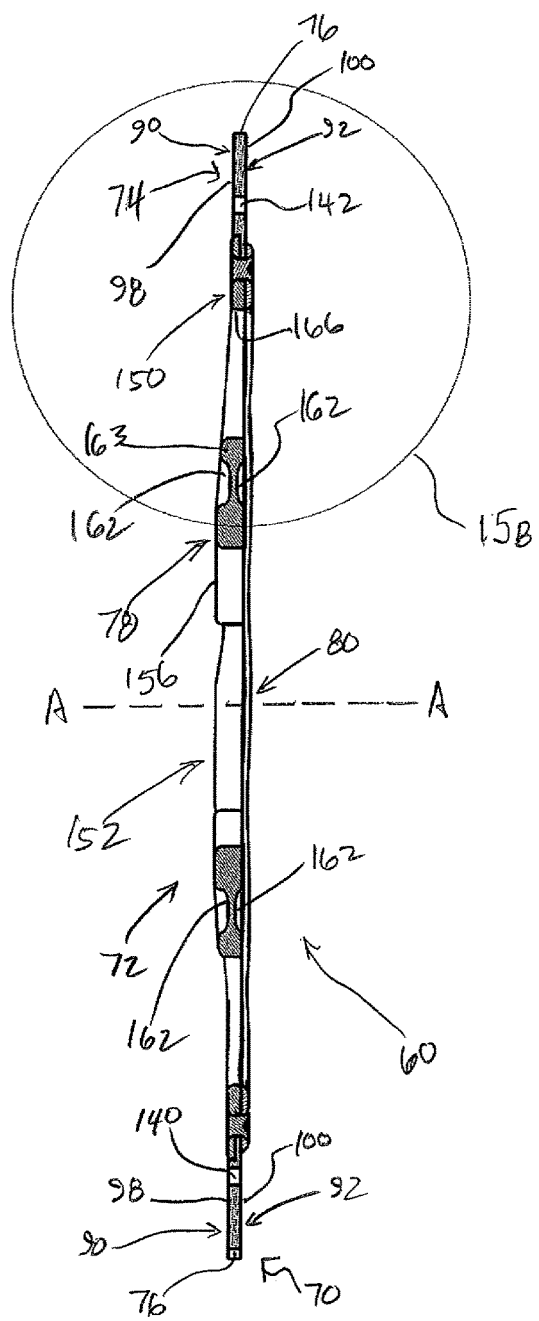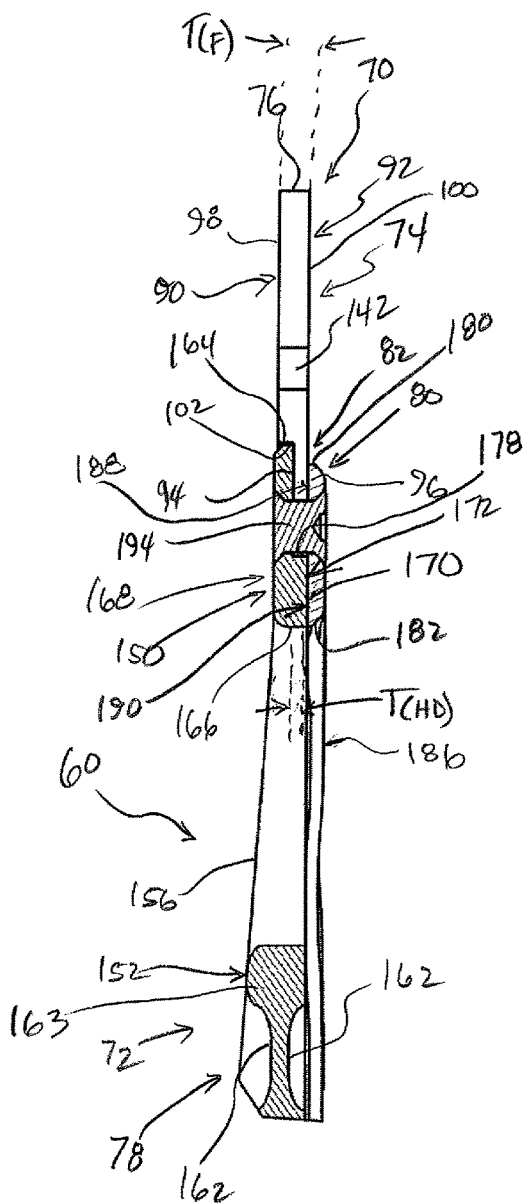
FIG. 15A
FIG. 15B

HEAT DISSIPATING BRAKE ROTOR

RELATED APPLICATIONS

This application is a continuation in part of U.S. patent application Ser. No. 15/189,815, filed Jun. 22, 2016, the contents of which are herein incorporated in their entirety.

BACKGROUND

1. Field of the Disclosure

This application is generally related to disc brakes for at least partially human powered vehicles, and more particularly to a heat dissipating brake rotor for same.

2. Description of Related Art

Disc brakes are well known for use on two-wheeled vehicles. Some disc brakes are also known for use specifically on bicycles. The typical disc brake system has a disc shaped brake rotor with a braking portion or friction region extending around the brake track or brake body. The system also has a brake caliper with brake pads that, when the caliper is actuated, contact the braking portion or friction region of the brake rotor to slow the bicycle or vehicle. In some instances, heavy braking may be required to slow the vehicle or bicycle, such as during high-speed downhill descents. Problems sometimes arise during such heavy braking situations that may not otherwise occur under normal or light use conditions.

In heavy or extreme braking conditions, excessive heat may be generated in the brake rotor. The typical brake rotor is not designed to dissipate excessive heat. Thus, the brake rotor is typically only capable of minimal heat dissipation. Excessive heat in the brake rotor can result in thermal fade in the brake system during heavy or extreme braking, which can render the brakes significantly less responsive. Excessive heat also increases the heat load on the brake rotor, as well as on the caliper, pads, fluid, and component seals.

Further, the typical brake rotor is not designed to handle thermal expansion in the brake rotor resulting from extreme temperatures during such heavy braking conditions or resulting from intermittent extreme usage and extreme temperature fluctuations during extended use. The brake rotor may warp during use when subjected to excessive heat or may even suffer permanent deformation. Existing solutions have been devised to try and improve heat dissipation in brake rotors for two-wheeled vehicles. One such solution has been to add aluminum material to the braking portion or friction region of the brake rotor. However, when exposed to excessive heat, such brake rotors can melt. Also, these attempted solutions have resulted in significantly higher manufacturing and part costs. As a result, such solutions have not been suitable for most two-wheeled vehicle markets or consumers.

SUMMARY

In one example according to the teachings of the present disclosure, a brake rotor for a two-wheeled vehicle, such as bicycle, has a brake body formed of a first material. The brake body has a generally annular shape with a radially outer friction region and a radially inner heat dissipation region. The heat dissipation region has a first axial contact surface. The brake rotor also has a carrier with a coupling region. The carrier is configured for transmitting a braking load between the braking body and the coupling region. The carrier includes a cooling body formed of a second material. The cooling body is coupled to the first axial contact surface of the brake rotor. The second material has a higher thermal conductivity than the first material and the cooling body includes a protrusion configured for heat transfer from the cooling body. The cooling body is in contact with the first axial contact surface around the brake body for a majority of a circumference of the heat dissipation region.

In one example, the brake body comprises a first alignment feature, and the protrusion comprises a second alignment feature, the first and second alignment features corresponding to generate an alignment of the brake body to the carrier. The alignment may be a rotational alignment of the brake body relative to the carrier about a rotational axis of the brake rotor.

In one example, the second material can be different from the first material.

In one example, the cooling body can be in contact with the first axial contact surface around the brake body for between 300 degrees and 360 degrees of the circumference of the heat dissipation region.

In one example, the cooling body can be in contact with the first axial contact surface around the brake body for 360 degrees of the circumference of the heat dissipation region.

In one example, the second material can be aluminum or an aluminum alloy.

In one example, the first material can be a stainless steel.

In one example, the heat dissipation region of the brake body can define or be part of an attachment portion of the brake body or such an attachment portion can define or be a part of the heat dissipation region.

In one example, the carrier can be disposed at least partially within a central opening of the brake body. The carrier can have one or more first contact sections in contact with the first axial contact surface. The first contact sections can be in contact with the heat dissipation region of the brake body.

In one example, the cooling body can include a second cooling body. One or both of the cooling body and the second cooling body can be disposed at least partially within a central opening of the brake body. The cooling body can have one or more first contact sections in contact with the first axial contact surface. The second cooling body can have one or more second contact sections in contact with a second axial contact surface of the brake body or of the heat dissipation region of the brake body. The second axial contact surface can face opposite the first axial contact surface on the brake body. The brake body or the heat dissipation region of the brake body can be captured or disposed between the one or more first contact sections and the one or more second contact sections. The protrusion may include a surface configured to contact the second cooling body and transfer heat therebetween.

In one example, the cooling body can include a second cooling body. One or more second contact sections of the second cooling body, one or more first contact sections of the first cooling body, or a combination thereof, can be configured and arranged to contact a second axial contact surface opposite the first axial contact surface on the brake body, the first axial contact surface, or both, for 360 degrees around the circumference of the heat dissipation region.

In one example, the braking load can result from a braking force applied to the friction region.

In one example, the coupling region of the carrier can be configured for mounting to a hub of a wheel of the bicycle.

In one example, at least a portion of the cooling body of the carrier can radially overlap the heat dissipation region of the brake body.

In one example according to the teachings of the present disclosure, a brake rotor for a two-wheeled vehicle, such as a bicycle, has a brake body formed of a first material. The brake body has a generally annular shape with a first axial surface and a second axial surface opposite the first axial surface. The brake rotor has a carrier formed of a second material. The carrier is coupled to the brake body such that one or more first contact sections of a first cooling body of the carrier contact the first axial surface of the brake body, the cooling body including a protrusion. The brake rotor has a second cooling body formed of a third material. The second cooling body is coupled to the brake body such that one or more second contact sections of the second cooling body contact the second axial surface of the brake body, the protrusion of the cooling body configured to contact the second cooling body to transfer heat therebetween. At least one of the second material or the third material has a higher heat conductivity than the first material of the brake body.

In one example, the first material can be a stainless steel.

In one example, the second material and the third material can be different from one another.

In one example, either one of or both of the second and the third material can be different from the first material.

In one example, the third material can be substantially the same as the second material.

In one example, the second material can be aluminum or an aluminum alloy.

In one example, the second and third materials can both be aluminum or an aluminum alloy.

In one example, the brake body can further include a central opening, an outer periphery, an inner periphery facing radially inward around the central opening, an attachment portion or heat dissipation region adjacent the inner periphery, and a braking portion or friction region disposed radially outward of the attachment portion.

In one example, the brake rotor can include an attachment portion radially inward of a braking portion. The attachment portion can have a first thickness between the first axial surface and the second axial surface and the braking portion can have a second thickness between the first axial surface and the second axial surface. The first thickness can be less than the second thickness.

In one example, the brake rotor can include an attachment portion radially inward of a braking portion. A second axial braking surface of the braking portion and a second axial contact surface of the attachment portion on the second axial surface can be co-planar with one another. A first axial braking surface of the braking portion and a first axial contact surface of the attachment portion on the first axial surface can lie in different planes, i.e., not be co-planar with one another.

In one example, the cooling body or the second cooling body can reside in an axial recess in the first axial surface or the second axial surface of the brake body.

In one example, the one or more first contact sections of the carrier can contact an attachment portion on the first axial surface of the brake body. The one or more second contact sections of the second cooling body can contact the attachment portion on the second axial surface of the brake body.

In one example, the cooling body and second cooling body can contact one another in a mating region that is radially inward of an inner periphery of the brake body.

In on example, the carrier and second cooling body can be joined to one another and to the brake body via fasteners through an attachment portion of the brake body, the second cooling body, and the carrier.

In one example, the one or more second contact sections and the one or more first contact sections can be substantially flat with the second cooling body and the carrier fastened to one another and to the brake body. However, the one or more second contact sections, the one or more first contact sections, or both may not be flat before the second cooling body and carrier are joined to one another and to the brake body.

In one example, the second cooling body can have a non-flat annular shape that is rendered substantially flat when the second cooling body and carrier are joined to one another and to the brake body.

In one example, the brake body can have a plurality of attachment features formed into an inner periphery of the brake body. An attachment portion of the brake body can be disposed or captured between the one or more second contact sections and the one or more first contact sections. The second cooling body and the carrier can be joined to one another and to the brake body by fasteners through the plurality of attachment features. The plurality of attachment features can be configured to permit relative radial expansion between the brake body and the second cooling body and carrier.

In one example, the brake rotor can be specifically constructed for a bicycle.

In one example, the brake body includes a first alignment feature, and the protrusion comprises a second alignment feature, the first and second alignment features corresponding to generate an alignment of the brake body to the carrier. The alignment may be a rotational alignment of the brake body relative to the carrier about a rotational axis of the brake rotor.

In one example, the one or more second contact sections, the one or more first contact sections, or both can contact the brake body 360 degrees around the brake body.

In one example according to the teachings of the present disclosure, a brake rotor for a bicycle includes a brake body formed of a first material and having a generally annular shape, the brake body having a first axial surface, a second axial surface opposite the first axial surface, and an inner periphery that faces radially inward and extends circumferentially around the brake body. The brake rotor also includes a carrier formed of a second material and coupled to the brake body such that one or more first contact sections of a first cooling body of the carrier contact the first axial surface of the brake body, the cooling body including a protrusion. The brake rotor also includes a second cooling body formed of a third material and coupled to the brake body such that one or more second contact sections of the second cooling body contact the second axial surface of the brake body, the protrusion of the cooling body configured to contact the second cooling body to transfer heat therebetween. The brake rotor also includes a plurality of attachment features formed into the inner periphery of the brake body. The second cooling body and carrier are joined to one another and to the brake body by fasteners through the plurality of attachment features, whereby the plurality of attachment features are configured to permit relative radial expansion between the brake body and the second cooling body and carrier.

In one example, the second cooling body can have a non-flat, wavy, or non-planar shape.

In one example, the second cooling body can have a non-flat or nonplanar configuration that can become substantially planar when the second cooling body and the carrier are joined with the fasteners.

In one example, the second cooling body can be annular or ring shaped.

BRIEF DESCRIPTION OF THE DRAWINGS

Objects, features, and advantages of the present invention will become apparent upon reading the following description in conjunction with the drawing figures, in which:

FIG. 13 shows a front or first side plan view of one example of a second cooling body part of the brake rotor of FIG. 2.

FIG. 14 shows an end or edge view of the second cooling body of FIG. 12.

FIG. 15A shows a cross-section of the brake rotor taken along line 15A-15A in FIG. 3.

FIG. 15B shows an enlarged segment of the brake rotor cross-section taken from circle 15B in FIG. 15A.

DETAILED DESCRIPTION OF THE DISCLOSURE

Figure 1:
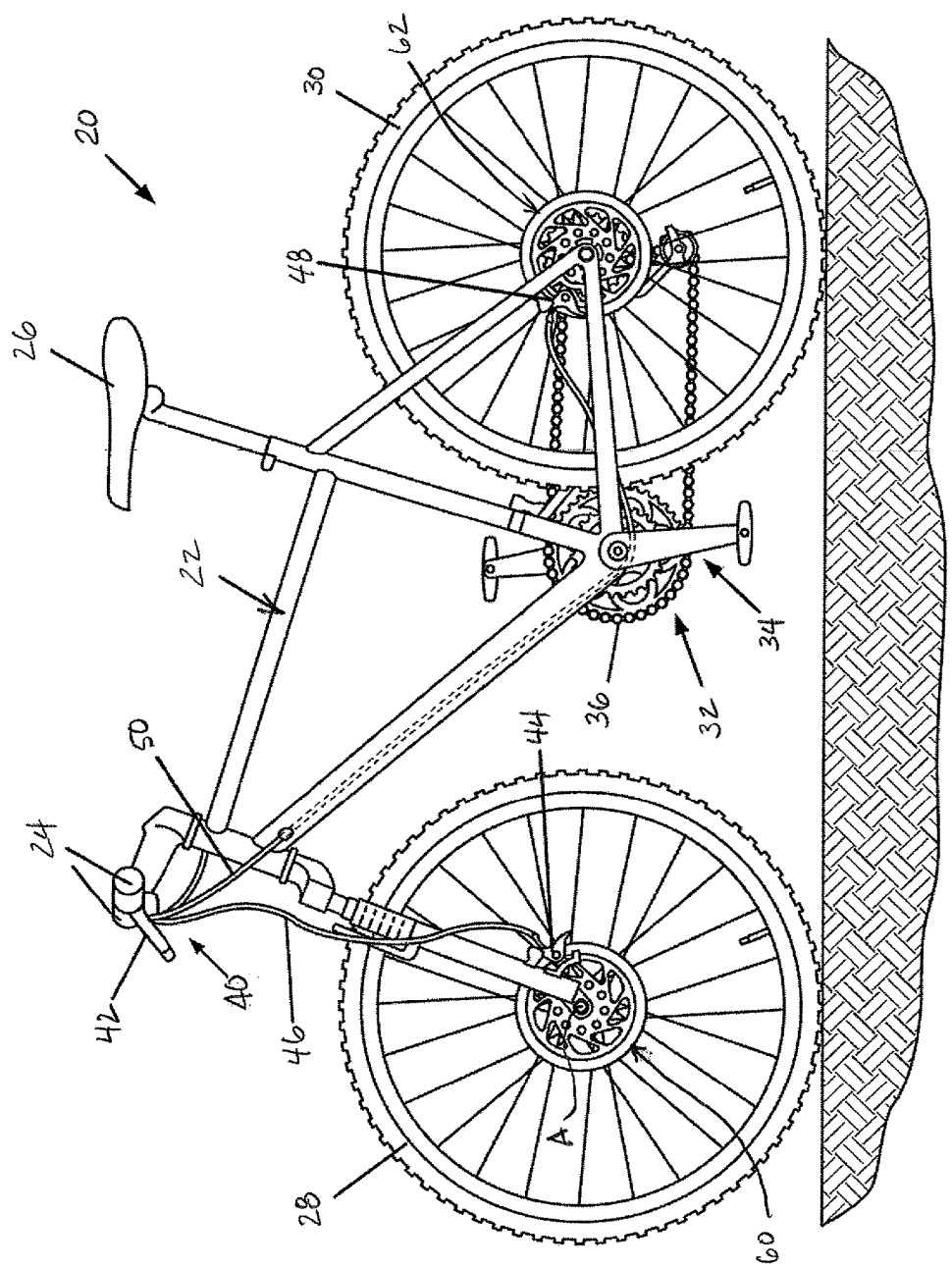
FIG. 1 shows a side elevational view of one example of a bicycle, which may be fitted with one or more brake rotors constructed in accordance with the teachings of this disclosure.

The brake rotors disclosed and described herein solve or improve upon one or more of the above-noted and/or other problems and disadvantages with prior known brake rotor deigns. The disclosed brake rotors can dissipate heat in the brake rotor to the surrounding environment during use. The disclosed brake rotors can aid in lowering the temperature of the brake rotor during use. The disclosed brake rotors, as a result, can reduce or eliminate thermal fade during heavy or extreme braking conditions. The disclosed brake rotors can also assist in reducing heat load on the brake rotor, the brake caliper, the brake pads, the brake fluid, and the component fluid seals. The disclosed brake rotors can withstand and allow for heat expansion in order to reduce or eliminate warping or permanent deformation in the brake rotor. The disclosed brake rotors can be fabricated and assembled using conventional manufacturing and assembly processes, including standard rivets, standard machining, and other standard operations. Thus, the disclosed brake rotors can be less expensive than other attempted heat dissipating rotor solutions. The disclosed brake rotors can be fabricated whereby the brake body portion is made entirely of stainless steel to withstand higher braking power and brake rotor temperatures.

Thus, brake rotors with heat dissipating characteristics are disclosed herein. The disclosed brake rotors can include a brake body and a heat sink or cooling element coupled to the brake body. In one example, the cooling element can be formed of a cooling body, which can be formed of a material having a higher thermal conductivity than the brake body material. In one example, the cooling body can be attached to or be an integral portion of a carrier that is coupled to the brake body. In one example, the cooling element or cooling body can include a second cooling body coupled to the brake body. In one example, the cooling element or cooling body can contact the brake body over a majority of the circumference of an attachment portion or heat dissipation region of the brake body. In one example, the cooling element can include both a cooling body, which is part of the carrier, and a second cooling body coupled to the brake body. One or both of the cooling body and second cooling body may be formed of the material having a higher thermal conductivity than the brake body material. In one example, both the cooling body of the carrier and the second cooling body can be formed of materials that are different from and that have a higher thermal conductivity than the material of the brake body. In one example, the brake body can be disposed or captured between portions of the carrier and the second cooling body. In one example, the cooling element, or the cooling body and second cooling body can continuously contact the brake body between 300 and 360 degrees around the circumference of an attachment portion or heat dissipation region of the brake body. In one example, the cooling body and second cooling body can contact one another and can each contact the brake body. These and other objects, features, and advantages of the disclosed brake rotors will become apparent to those having ordinary skill in the art upon reading this disclosure.

Turning now to the drawings, FIG. 1 illustrates one example of a two-wheeled vehicle on which the disclosed brake rotors may be implemented. In this example, the two-wheeled vehicle is one possible type of bicycle 20, such as a mountain bicycle. The bicycle 20 has a frame 22, handlebars 24 near a front end of the frame, and a seat 26 for supporting a rider over a top of the frame. The bicycle 20 also has a first or front wheel 28 supporting the front end of the frame 22 and a second or rear wheel 30 supporting a rear end of the frame. The bicycle 20 also has a drive train 32 with a crank assembly 34 that is operatively coupled via a chain 36 to a rear cassette (not shown) near a rotation axis of the rear wheel 30. While the bicycle 20 depicted in FIG. 1 is a mountain bicycle, the brake rotor embodiments and examples disclosed herein may be implemented on other types of bicycles such as, for example, road bicycles, as well as bicycles with mechanical (e.g., cable, hydraulic, pneumatic, etc.) and non-mechanical (e.g., wired, wireless) drive systems. The disclosed brake rotors may also be implemented on other types of two-wheeled vehicles as well.

With that in mind, the bicycle 20 of FIG. 1 also has a hydraulic brake system 40. In the illustrated embodiment, the hydraulic brake system 40 includes a first brake lever assembly 42 disposed on the handlebars 24 and a second brake lever assembly (not shown), also disposed on the handlebars. The first brake lever assembly 42 is hydraulically coupled to a first brake caliper 44 via a first hydraulic brake line 46. On the bicycle 20 in this embodiment, the first brake caliper 44 is operatively coupled to the front wheel 28. The second brake lever assembly is hydraulically coupled to a second brake caliper 48 via a second hydraulic brake line 50. On the bicycle 20, the second brake caliper 48 is operatively coupled to the rear wheel 30. In other embodiments, the hydraulic brake system 40 may include one or more additional and/or alternative components and/or may be configured in other ways. Additionally, the hydraulic brake system 40 may be replaced by a different type of brake system, such as a non-hydraulic brake system using mechanical brake cables, wires, or the like or such as a non-mechanical brake system utilizing electronic or wireless components.

In this example, the bicycle 20 also has a first or front brake rotor 60 carried at the rotation axis A of the front wheel 28 for rotation therewith. The bicycle 20 also has a rear brake rotor 62 carried at the rotation axis of the rear wheel 30 for rotation therewith. Each of the front and rear brake rotors 60 and 62 can be constructed according to the teachings of the present disclosure, as described in more detail below. When the first brake lever assembly 42 is actuated, brake fluid flows within the first brake line 46 to the first brake caliper 44 and actuates brake pads carried by the first brake caliper. The pads, though not shown herein, are in contact with a portion of the first brake rotor 60. Friction between the brake pads and the brake rotor 60 acts to slow rotation of and thus brake the front wheel 28. Likewise, when the second brake lever assembly is actuated, brake fluid flows within the second brake lines 50 to the second brake caliper 48 and actuates brake pads carried by the second brake caliper. The pads are in contact with a portion of the second brake rotor 62 and friction between the brake pads and the brake rotor 62 acts to slow rotation of and thus brake the rear wheel 30.

When the brake pads of the first brake caliper 44 contact and apply pressure against surfaces of the first brake rotor 60, the friction generates heat. Likewise, when the pads of the second brake caliper 48 contact and apply pressure against surfaces of the second brake rotor 62, the friction generates heat. The disclosed brake rotor embodiments are configured to effectively dissipate heat generated during such a braking operation, as described in more detail below. The first and second brake rotors 60, 62 may be of the exact same size on the bicycle 20 or the two brake rotors may be of a different size. It is possible that the brake rotors 60 and 62 also have the identical construction on the bicycle 20. However, it is also possible that the two brake rotors 60, 62 have different constructions and/or that only one of the brake rotors, such as the front brake rotor 60, is constructed according to the teachings of the present disclosure. In the description below, only the front brake rotor 60 is described in detail. However, the description may be equally applicable to the rear brake rotor as well, though not mentioned after this point herein.

Figure 2:
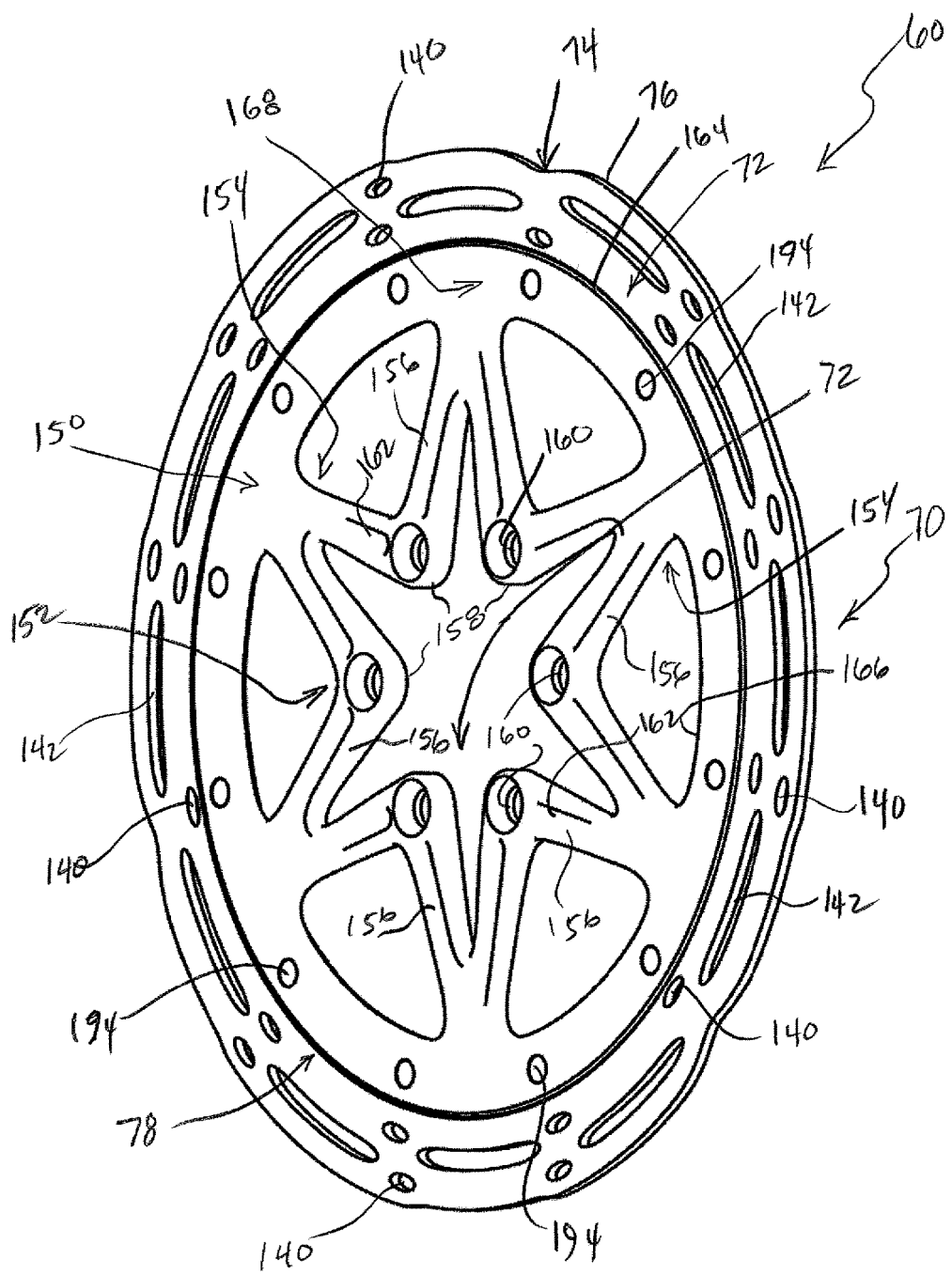
FIG. 2 shows a front or first side perspective view of one example of a brake rotor constructed in accordance with the teachings of the present disclosure and which can be used on the bicycle of FIG. 1.

FIG. 2 shows one example of the front brake rotor 60 constructed in accordance with the teachings of the present disclosure. In this example, the brake rotor 60 generally has a brake track or brake body, hereinafter referred to as the brake body 70, and a cooling element or heat sink, hereinafter referred to as the heat sink 72, coupled to the brake body. The brake body 70 can be formed of a first material. At least part of the heat sink 72 can be formed of a heat dissipating material that is different from and/or that has a higher thermal conductivity than the first material of the brake body 70. The heat dissipating material that forms at least part of the heat sink 72 has a higher thermal conductivity than the first material of the brake body 70 to absorb or conduct heat from the brake body to the heat sink 72, as discussed in more detail below.

Figure 3:
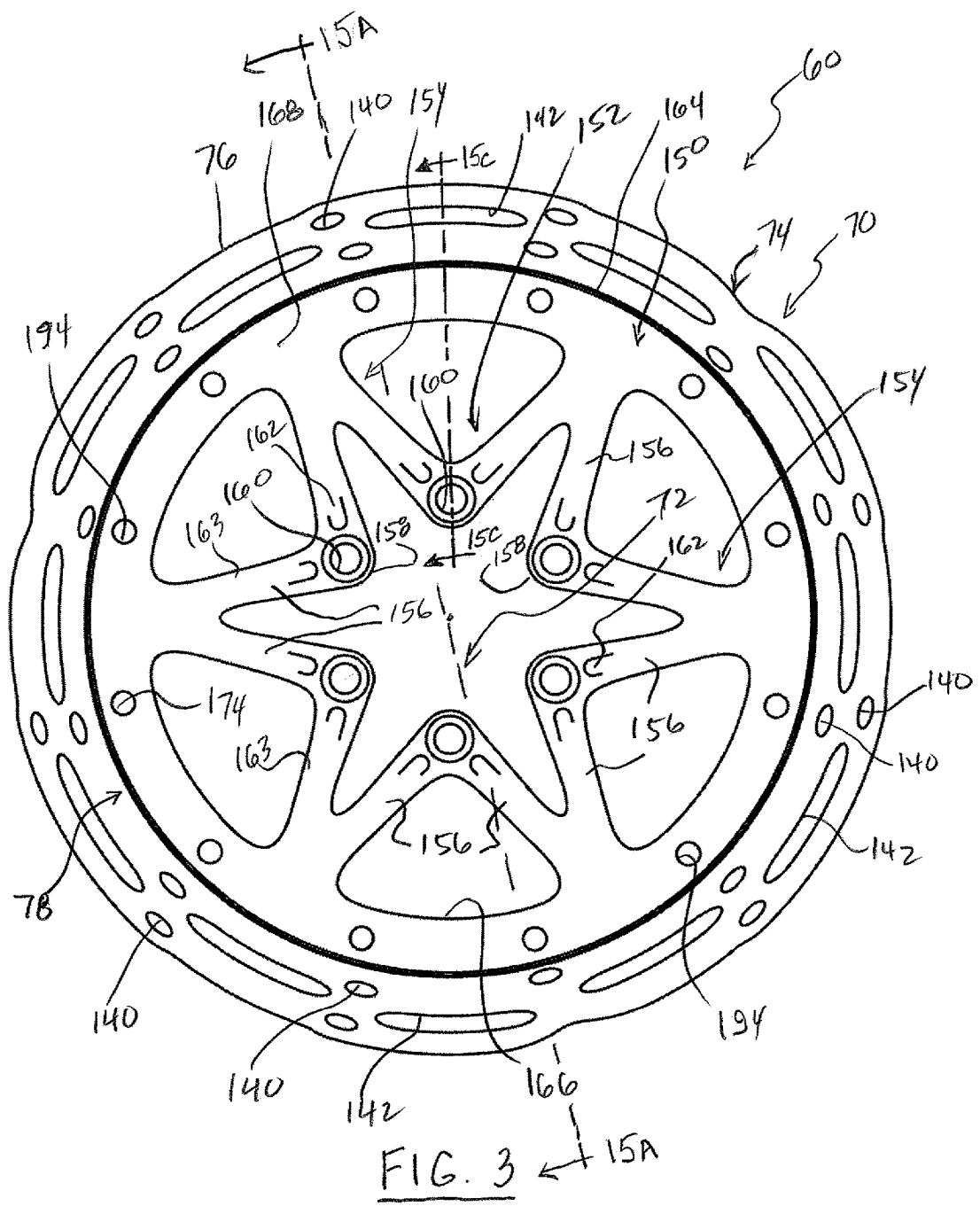
FIG. 3 shows a front or first side plan view of the brake rotor of FIG. 2.

Basic details of the front brake rotor 60 are described below with reference to FIGS. 2-5. As shown in FIGS. 2 and 3, the brake body 70 can be generally annular or have somewhat of a ring shape. The brake body 70 can have or define a radially outer friction region or braking portion, hereinafter referred to as the friction region 74. A periphery 76 of the brake body 70 is defined by the outer radial edge of the friction region 74. In one example, the brake rotor 60 has a carrier 78 that is coupled or connected to the brake body 70. The carrier 78 is configured to join or mount the brake body 70 to a hub or other part of the front wheel 28 of the bicycle 20 for rotation with the front wheel. The carrier 78 in this example is disposed radially inward of the friction region 74 on the brake body 70. Details of the carrier 78, including a cooling body or a first cooling body of the heat sink 72, are described below.

Figure 4:
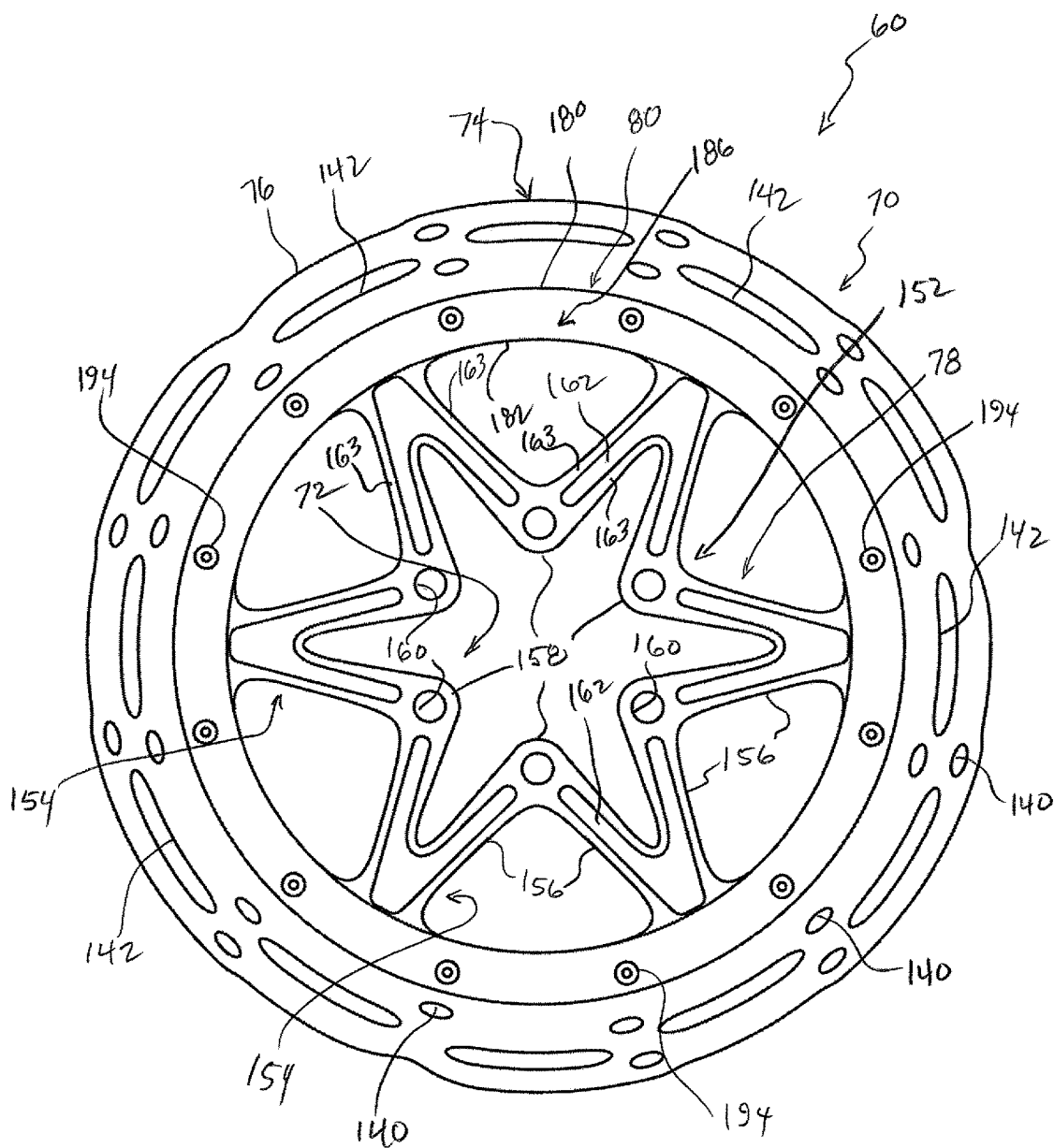
FIG. 4 shows a rear or second side plan view of the brake rotor of FIG. 2.
Figure 5:
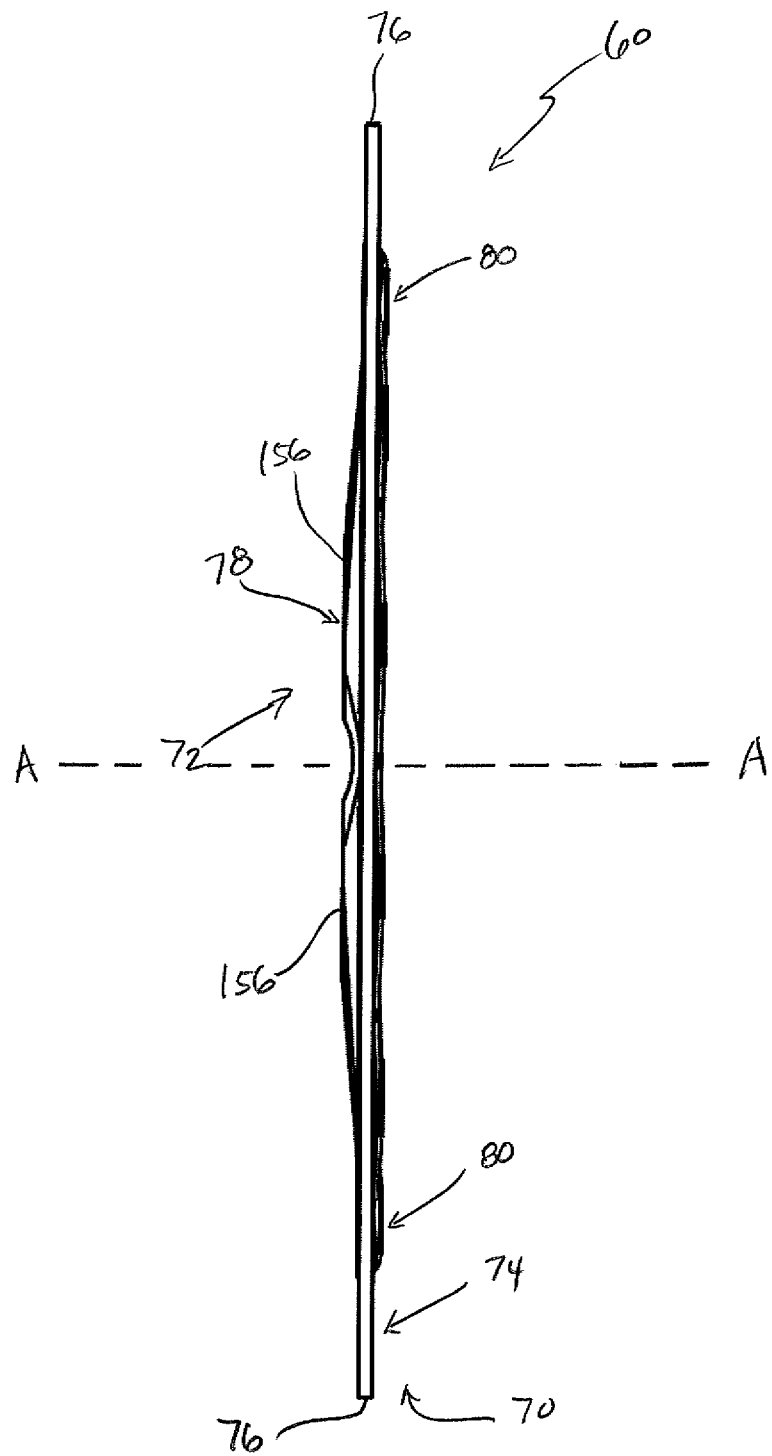
FIG. 5 shows an end or edge view of the brake rotor of FIG. 2.

As shown in FIGS. 4 and 5, the brake rotor 60 in one example can also have a backing body or second cooling body, hereinafter referred to as the second cooling body 80, coupled or connected to the brake body 70. The second cooling body 80 is configured to assist in securing the carrier 78 to the brake body and forms part of the heat sink 72. The second cooling body 80 is also disposed radially inward of the friction region 74 on the brake body 70. The rotation axis A is depicted in FIG. 5 and provides the reference herein for the use of the terms radial, radial direction, axial and axial direction.

In one example, the second cooling body 80 can be formed of the heat dissipating material and may define the entire heat sink 72. In another example, the carrier 78 or a cooling body thereof can be formed of the heat dissipating material and may define the entire heat sink 72. In such examples, the other of the cooling body or carrier 78 or the second cooling body 80 can be formed of another material, i.e., a third material. The third material may be different from both the first material and the heat dissipating material or may be the same as the first material of the brake body 70. In still another example, as disclosed herein, each of the carrier 78 or a cooling body thereof and the second cooling body 80 can form a part of the heat sink 72. In such an example, the carrier 78 or the cooling body can be formed of a second material and the second cooling body 80 can be formed of a third material. Both of the second and third materials can then be heat dissipating materials, i.e., with a higher thermal conductivity than the first material of the brake body 70. In one example, the second and third materials can be substantially similar to one another. In other words, the second and third materials would then each have at least similar thermal conductivity characteristics and a thermal conductivity that is higher than that of the first material of the brake body 70. In still another example, as in the disclosed embodiment of FIGS. 2-4, each of the carrier 78 or a cooling body thereof and second cooling body 80 can form a part of the heat sink 72 and each of the second and third materials can be the same material.

In an embodiment, the third material may have a higher thermal conductivity than both the first material and the second material. For example, the first material may be a steel, such as a stainless steel, to allow for braking forces applied thereon, the second material may be aluminum or an aluminum alloy so as to have structural properties to transmit torque resulting from the braking forces yet have a higher thermal conductivity than the first steel material, and the third material may be a material such as copper or a copper alloy so as to provide the second cooling body 80 an even higher thermal conductivity than the carrier 78 (e.g. the first cooling body). Other high thermal conductivity materials may be used in the construction of the second cooling body 80 as well to provide high thermal conductivity, even relative to the first cooling body. For example, diamond based materials such as natural, isotopically enriched, and/or other manmade diamond materials, gold or gold alloys, silver or silver alloys, graphene, graphite, and/or combinations thereof may be used in the construction of the second cooling body to provide for the higher thermal conductivity.

Figure 6:
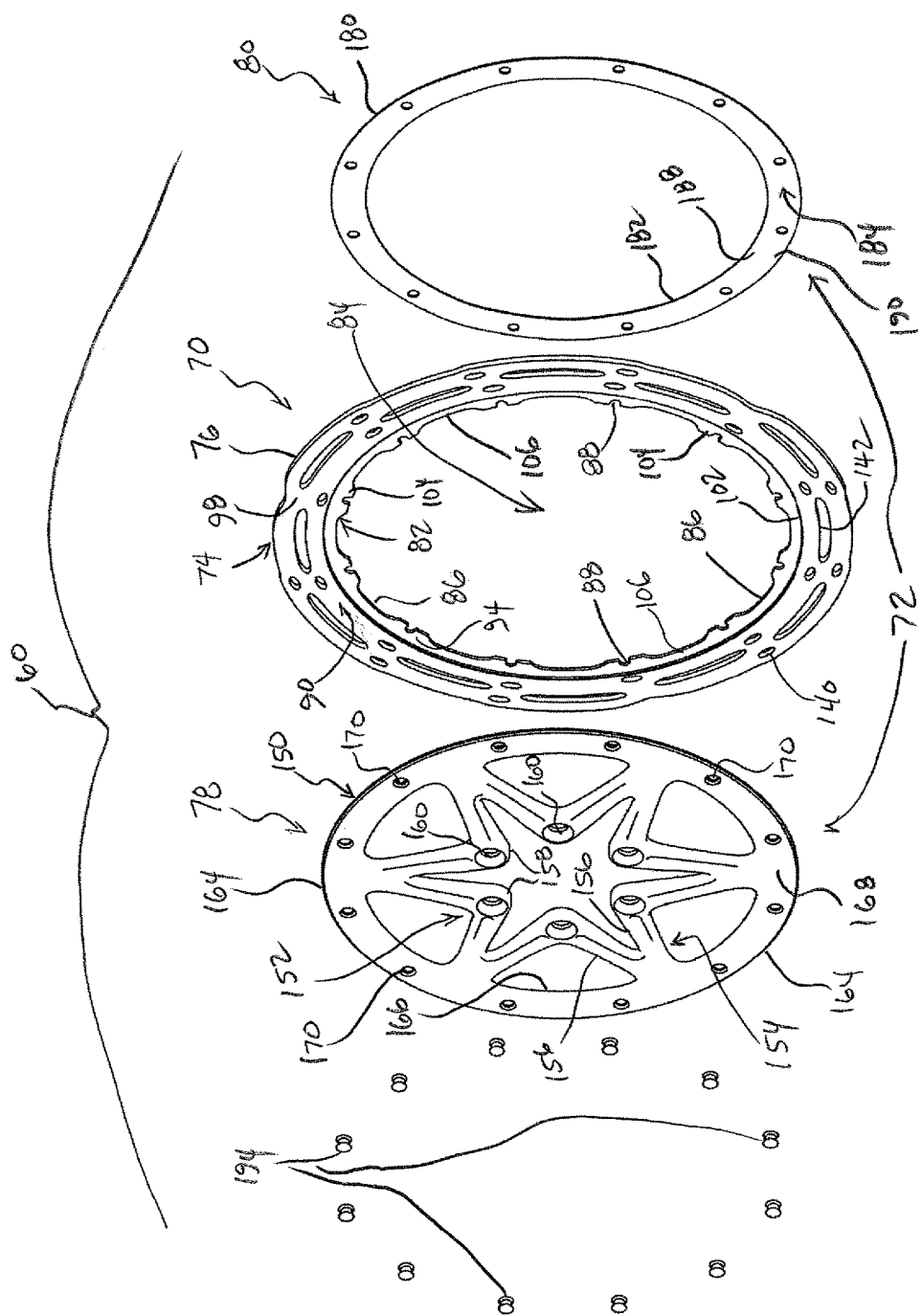
FIG. 6 shows a front or first side perspective exploded view of the brake rotor of FIG. 2.
Figure 7:
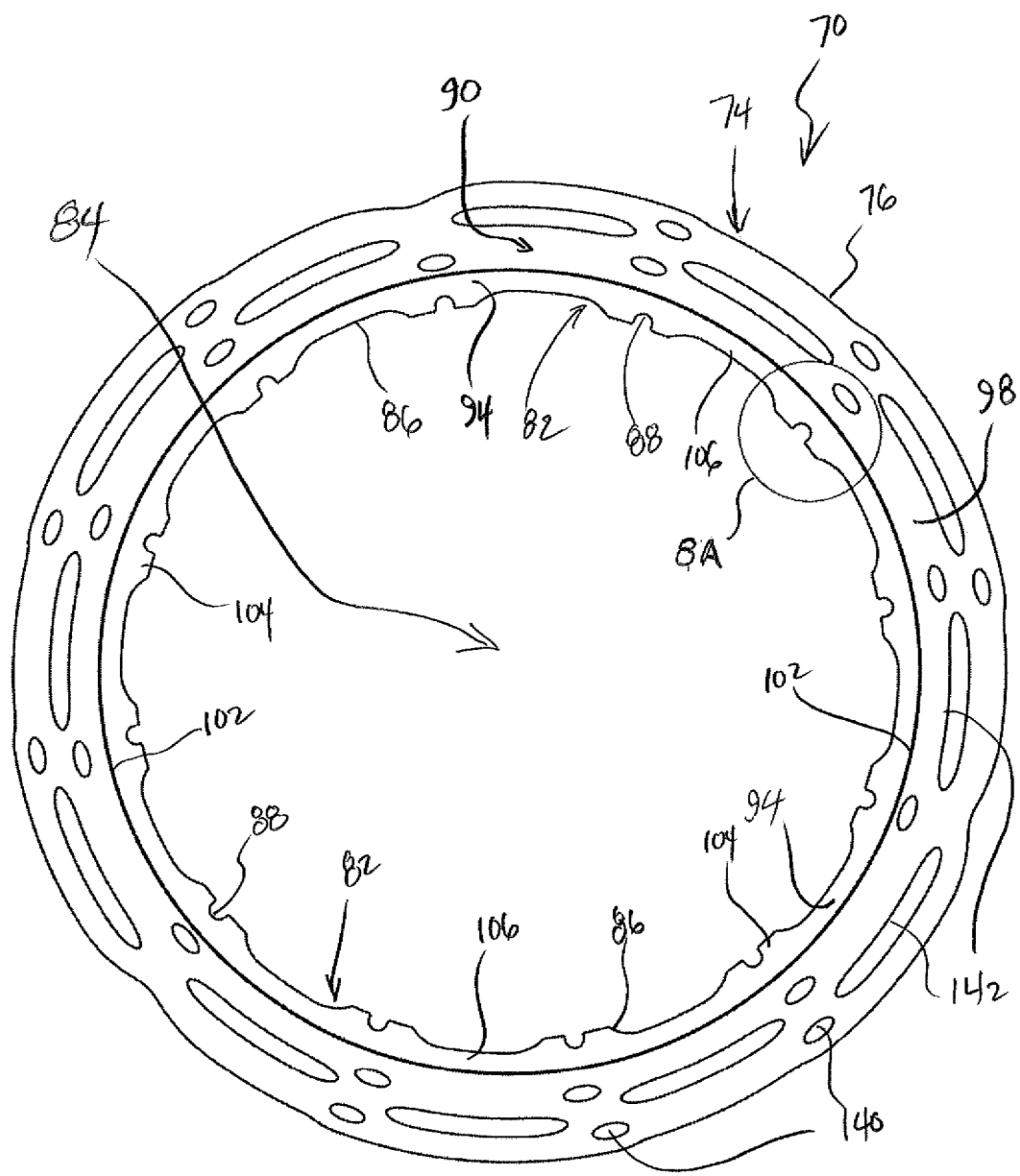
FIG. 7 shows a front or first side plan view of one example of a brake body part of the brake rotor of FIG. 2.

FIG. 6 shows an exploded perspective view of the brake rotor 60 depicted in FIGS. 2-5, including the brake body 70, the carrier 78, and the second cooling body 80. Details of the brake body 70 are first described with reference to FIGS. 6, 7, 8A, and 8B. As shown in FIGS. 6 and 7, the brake body 70, as noted above, is annular or generally ring shaped and includes the radially outer friction region 74. The outer periphery of the brake body 70 is defined by the outermost radial edge of the friction region 74. The brake body 70 also has an attachment portion which may be a part of a heat dissipation region, hereinafter the heat dissipation region 82, that is disposed radially inward of the friction region 74. The annular shape of the brake body 70 defines a central opening 84 disposed radially inward of the heat dissipation region 82. An innermost edge or inner periphery 86 of the brake body 70 faces inward toward and extends circumferentially around the central opening 84, thus defining the central opening. In this example, the radial inner most extent of the heat dissipation region 82 defines the inner periphery 86. The heat dissipation region 82 is thus positioned directly adjacent the inner periphery 86. However, additional sections or segments of an attachment portion of the brake body 70 could be disposed between the heat dissipation region 82 and the inner periphery 86, if desired.

Figure 8A:
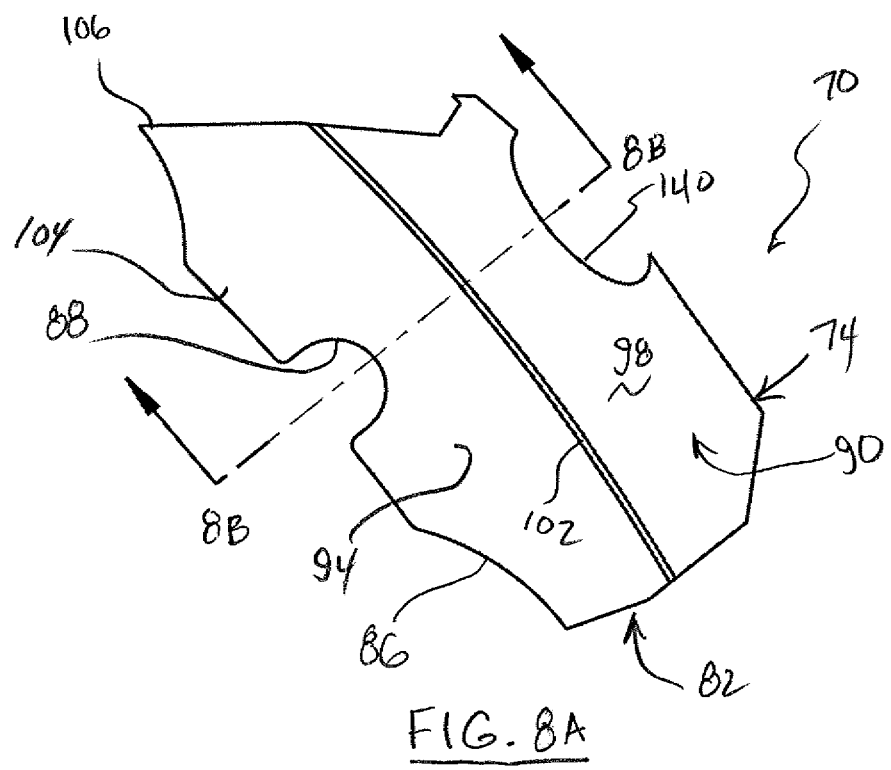
FIG. 8A shows an enlarged segment of portions of the brake body taken from circle 8A in FIG. 7.
Figure 8B:
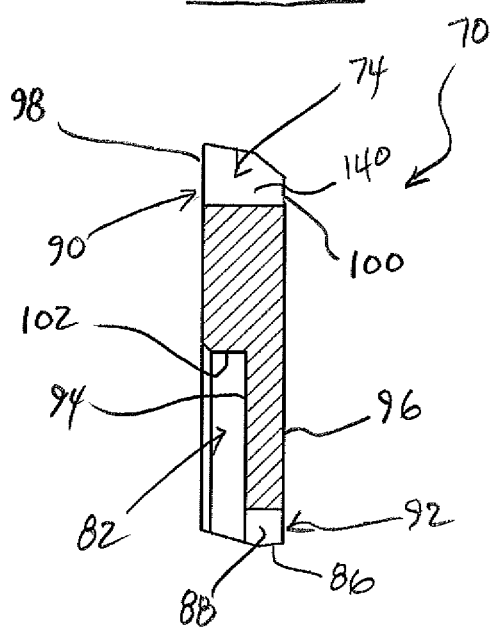
FIG. 8B shows a cross-section of the portions of the brake body taken along line 8B-8B in FIG. 8A.

With reference to FIGS. 7 and 8A, a plurality of attachment features are provided in the attachment portion or heat dissipation region 82 of the brake body 70. The attachment features can be elongate holes, non-round holes, closed slots, open ended slots, or the like. In this example, the attachment features include multiple open ended slots 88 formed into the inner periphery 86 in a radial outward direction. Each slot 88 is open toward the central opening 84. With reference to FIGS. 7, 8A, and 8B, the brake body 70 has a first face or first axial surface, hereinafter referred to as the first axial surface 90, which is facing in a first axial direction. The brake body 70 also has a second face or second axial surface, hereinafter referred to as the second axial surface 92, which is facing in a second axial direction opposite the first axial surface. The heat dissipation region 82 has a first axial contact surface 94 on the brake body 70 that is facing in the first axial direction or in the same direction as the first axial surface 90. The heat dissipation region 82 also has a second axial contact surface 96 on the brake body 70 that is facing in the second axial direction and opposite the first axial contact surface 94. The friction region 74 has a first axial braking surface 98 on the brake body 70 that is facing in the first axial direction. The friction region 74 also has a second axial braking surface 100 that is facing in the second axial direction and opposite the first axial braking surface 98.

In the disclosed example, the heat dissipation region 82 has a first thickness $T_{(HD)}$ between the first axial surface 90 and the second axial surface 92 on the brake body 70 or, more specifically, between the first axial contact surface 94 and the second axial contact surface 96. The friction region 74 has a second thickness $T_{(F)}$ between the first axial surface 90 and second axial surface 92 on the brake body 70. The first thickness $T_{(HD)}$, i.e., the thickness of the heat dissipation region 82 in this example is less than the second thickness $T_{(F)}$, i.e., the thickness of the friction region 74. As shown in FIG. 8B, the second axial braking surface 100 and the second axial contact surface 96 are co-planar with one another on the second axial surface 92 of the brake track. Thus, the second axial surface 92 is substantially flat in this example. The first axial braking surface 98, however, and the first axial contact surface 94 are not co-planar with one another on the first axial surface 90 of the brake body 70. Thus, the thinner heat dissipation region 82 defines a recess or pocket in the first axial surface 90 in this example. An axial shoulder 102 extends circumferentially around the brake body 70 and faces or opens to the first axial contact surface 94 on the heat dissipation region 82. The axial shoulder 102 creates the transition between the different thicknesses of the two regions 74, 82. In this example, the axial shoulder is circular, as depicted in FIG. 7.

The inner periphery 86 of the heat dissipation region 82 is not circular in this example. However, the heat dissipation region 82 in this example is a continuous circumferential structure that extends radially inward relative to the axial shoulder 102. As shown in FIG. 7, the heat dissipation region 82 has a radial dimension inward from the axial shoulder 102 that varies circumferentially around the brake body 70. The heat dissipation region 82 has taller segments 104 and shorter segments 106 that are intermittently spaced around the circumference of the heat dissipation region 82. The plurality of slots 88 are formed into the inner periphery 86 in the taller segments 104 and the shorter segments 106 are interspersed between the slots 88 and the taller segments 104.

Figure 9:
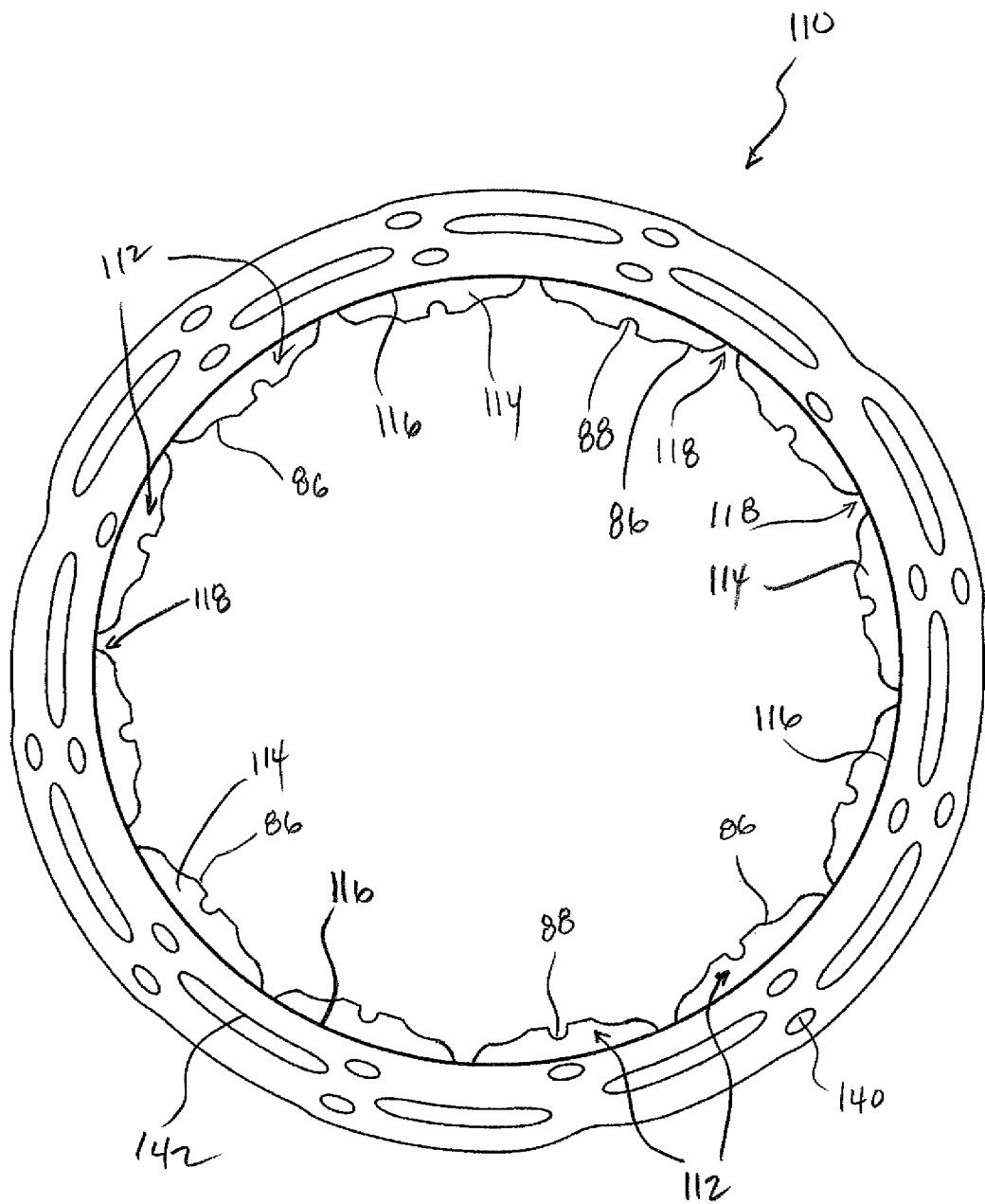
FIG. 9 shows a front or first side plan view of another example of a brake body part that can be used on the brake rotor of FIG. 2.

In other examples, the heat dissipation region of the brake body may not be a continuous circumferential structure. As shown in FIG. 9, a brake body 110 is depicted with similar features to the brake body 70. These similar features are identified with the same reference numbers in each example. The brake body 110 in this example, however, has a heat dissipation region 112 that is not a continuous circumferential structure. Instead the heat dissipation region 112 is a segmented structure with individual segments 114 that are circumferentially spaced apart around the brake body 110. In this example, the opposite axial facing sides of the segments 114 each form a portion of the first and second axial contact surfaces 94, 96 of the heat dissipation region 112. The segments 114 each extend radially inward from an axial shoulder 116 and are separated by gaps 118 between the segments. Each segment 114 has a radial dimension inward from the axial shoulder 116 that varies over the length of each segment. Each segment 114 is taller near the center and shorter near the adjacent gaps 118. The plurality of slots 88 are formed into the inner periphery 86 in the taller center part of each segments 114.

Figure 10:
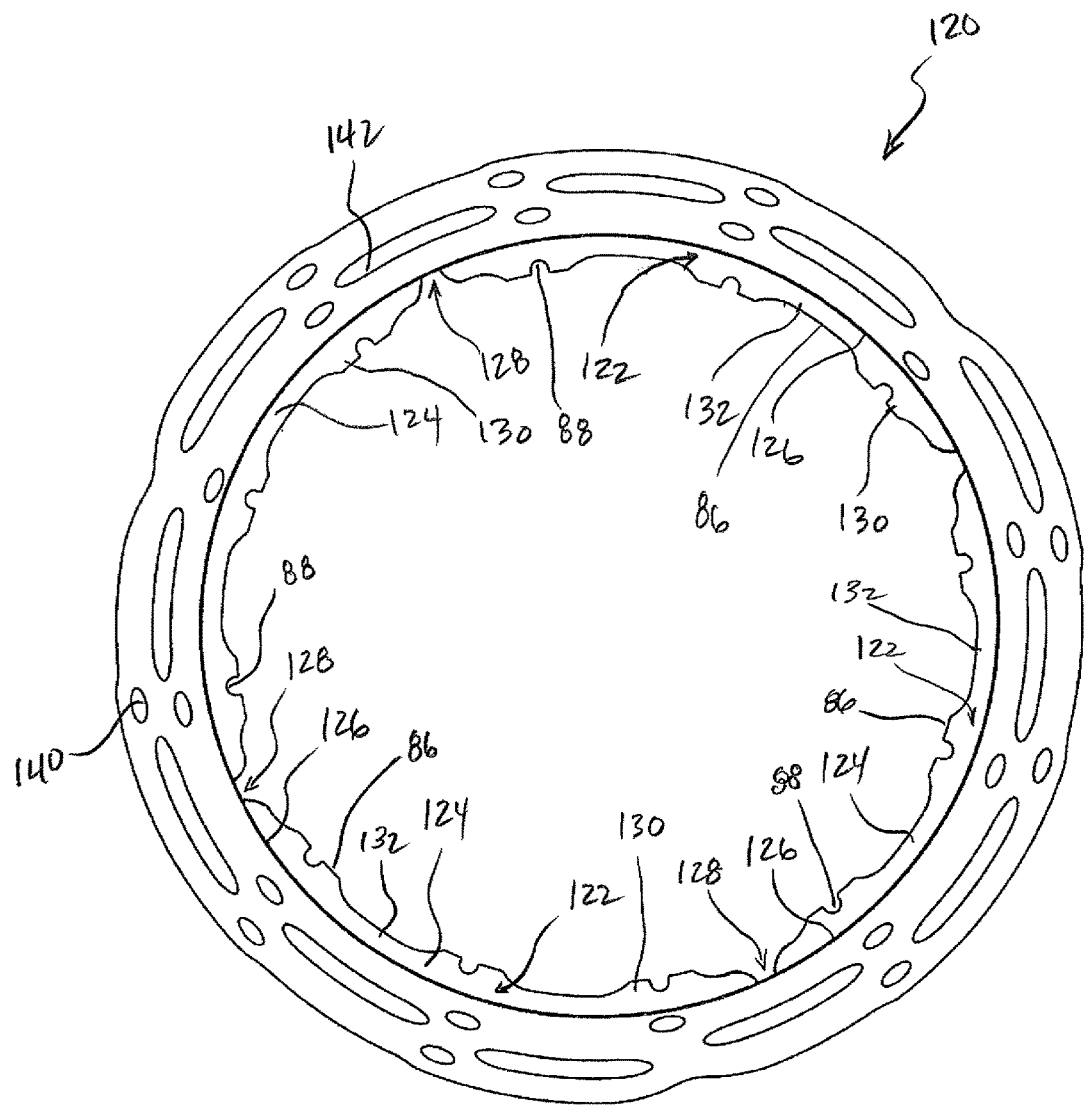
FIG. 10 shows a front or first side plan view of another example of a brake body part that can be used on the brake rotor of FIG. 2.

FIG. 10 shows another example of a brake body 120, also with similar features to the brake body 70. These similar features are again identified with the same reference numbers in each example. The brake body 120 in this example, however, has a different heat dissipation region 122 that is also a segmented structure with individual segments 124 that are circumferentially spaced apart around the brake body 120. In this example, the opposite axial facing sides of the segments 124 again each form a portion of the first and second axial contact surfaces 94, 96 of the heat dissipation region 122. The segments 124 each extend radially inward from an axial shoulder 126 and are separated by gaps 128 between the segments. Each segment 124 in this example has a radial dimension inward from the axial shoulder 126 that again varies over the length of each segment. Each segment 124 in this example has three taller sections 130, one near the center of the segment 124, separated by two shorter sections 132 and two shorter ends near the adjacent gaps 128. The plurality of slots 88 are formed into the inner periphery 86 in the taller sections 130 of each segment 124 so that each segment includes three of the slots. As indicated by these alternate examples, the configuration and construction of the heat dissipation region 82 can vary. The thickness and the radial dimension or height of the heat dissipation region can vary. The number of gaps can vary, as can the number of segments, if any.

In each brake body example, the friction region 74 has a number of shaped perforations or through holes 140 and slots 142 formed through the region. The size, number, shape, arrangement, orientation, and the like of these holes 140 and slots 142 can vary considerably. These holes 140 and slots 142 can be provided to reduce material usage, reduce component weight, and/or to create air flow through the friction region 74 of the brake body 70 to increase cooling of the brake body material, if desired. These holes 140 and slots 142, however, can be eliminated, if desired or not needed for adequate cooling of the brake rotor 60.

Other examples and constructions of the brake body 70 including the friction region 74 and the heat dissipation region 82 are also possible, as will become evident to those having ordinary skill in the art. Some additional alternatives are discussed below when describing the assembled brake rotor 60 and its function. However, the first material used to form the brake body 70 can vary. In one example, the brake body 70 can be formed of a stainless steel material. The brake body material, in order to meet performance requirements, may have a hardness of about 30 HRC (Rockwell C scale hardness) or higher to avoid brake pad and debris abrasion and wear in the first and second axial braking surfaces 98 and 100. Though possible to use a less hard material, a lower hardness may cause premature or otherwise undesirable brake wear. The brake body 70 may have a harness in a range of between about 36-42 HRC, which is achievable by heat treating a martensitic stainless steel alloy. Other first or brake body materials, however, are certainly possible.

The size of the brake rotor 60 and brake body 70 can also vary. In some examples, the range of diameters for the brake body 70 can be anywhere from about 100 mm to about 250 mm. The disclosed brake rotor 60 may be optimally designed for current mountain and road bike standard diameters, such as 140 mm, 160 mm, 180 mm, and 200 mm. Brake rotor diameters larger than such standard sizes may require additional or altered features to accommodate thermal growth or heat dissipation performance, as needed.

Figure 18:
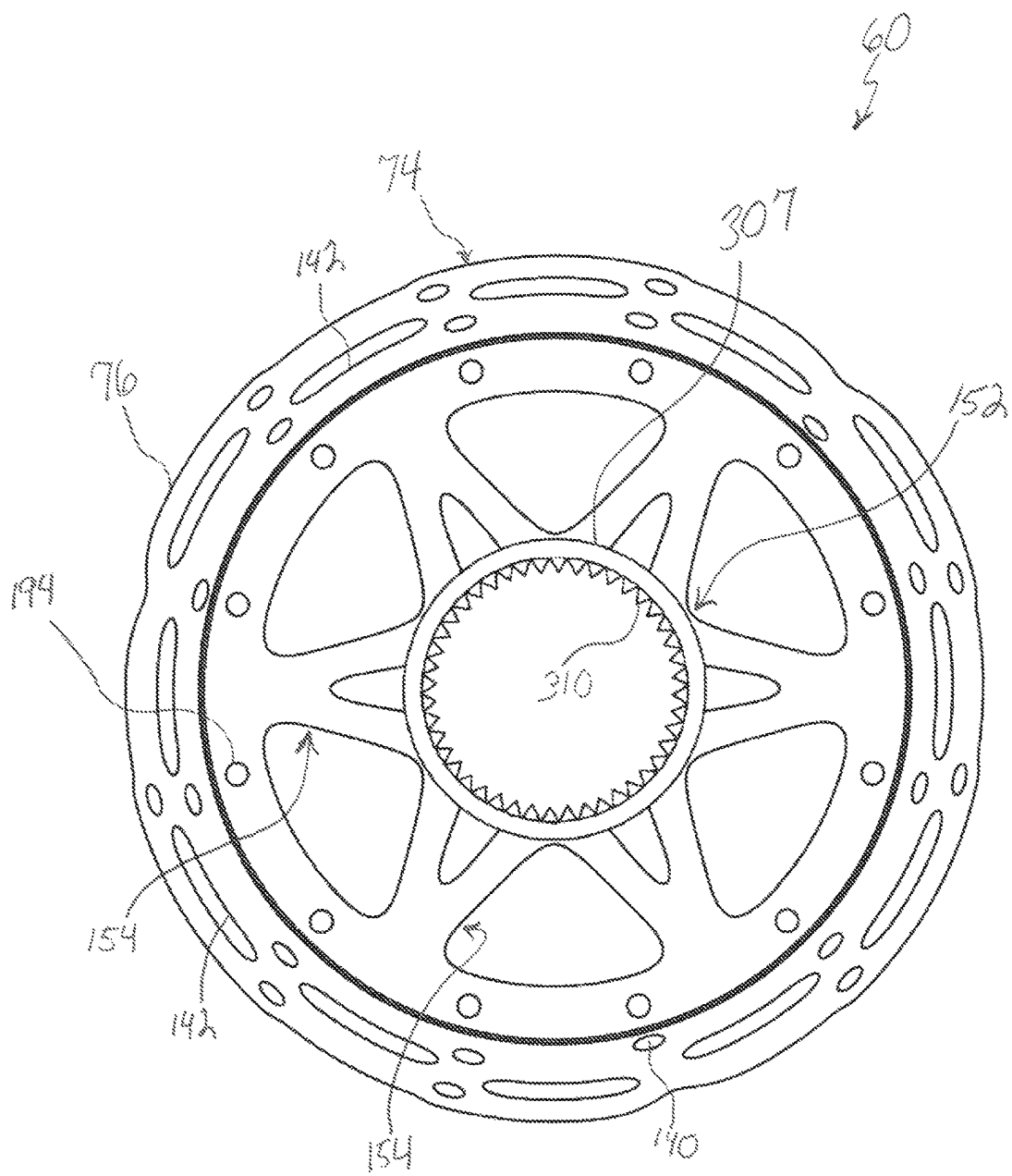
FIG. 18 shows a brake rotor with an alternate wheel coupling portion.
Figure 19A:
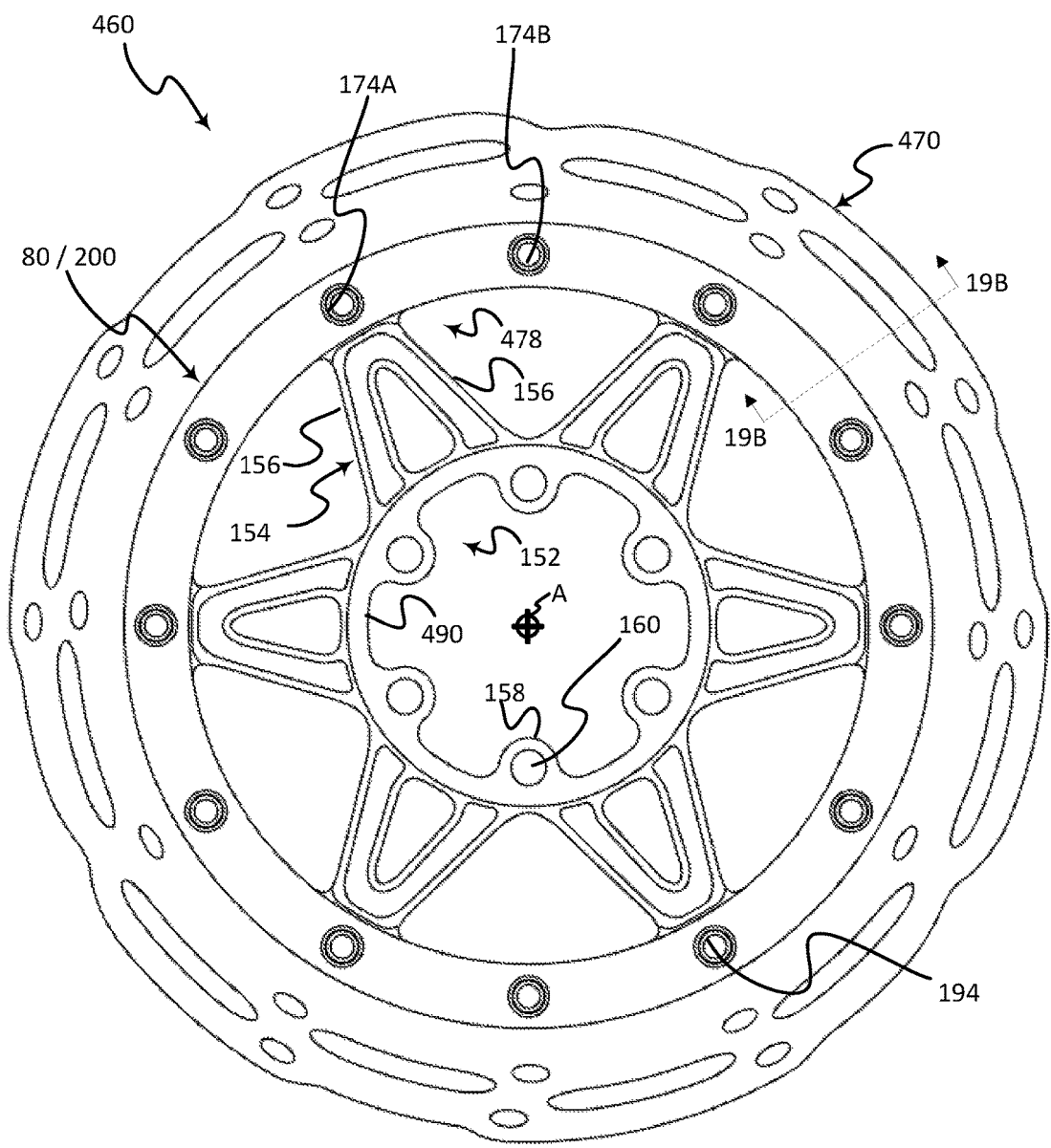
FIG. 19A shows a front or first side plan view of another embodiment of a brake rotor.
Figure 19B:
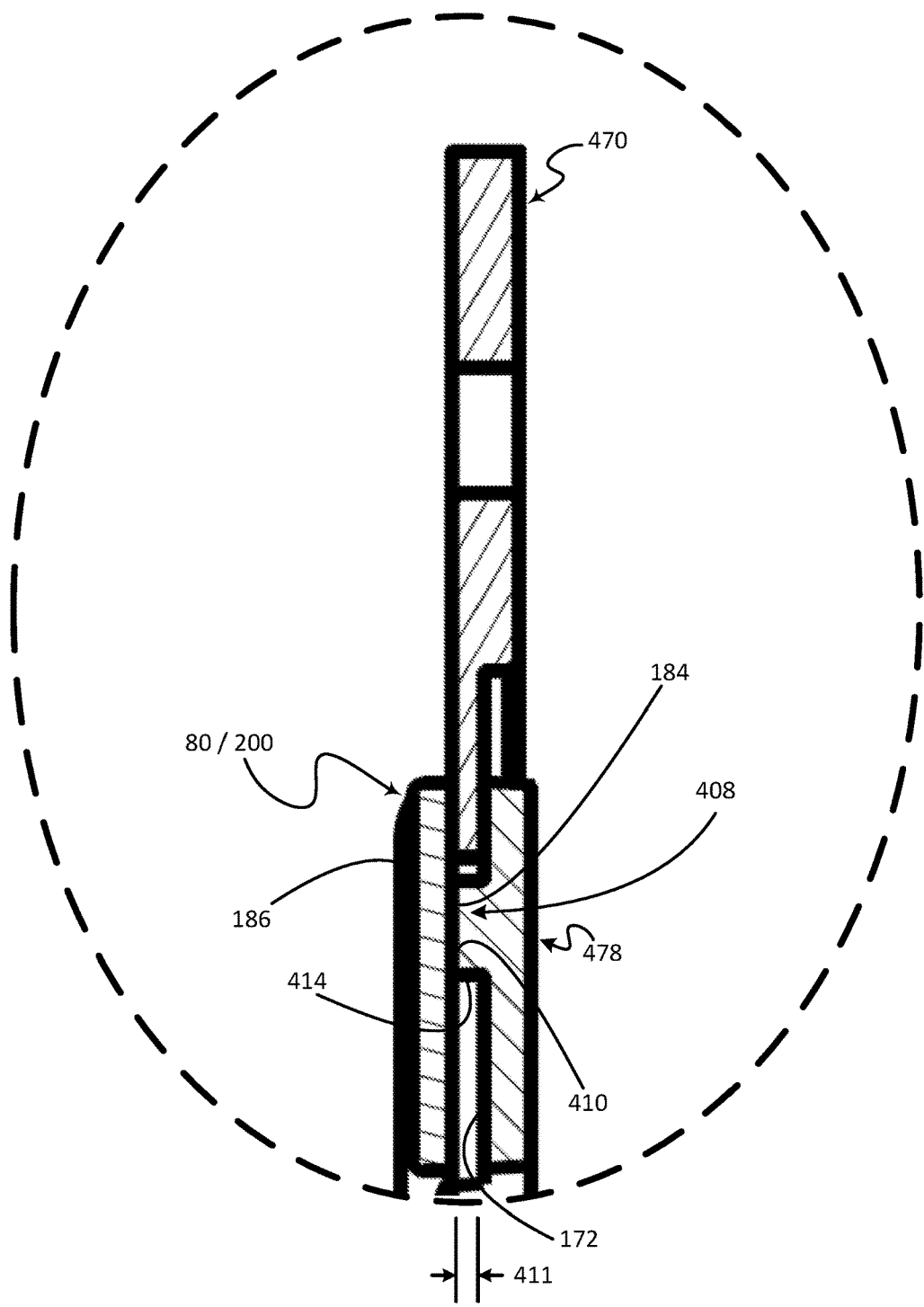
FIG. 19B shows a cross sectional view of the brake rotor of FIG. 19A.
Figure 20A:
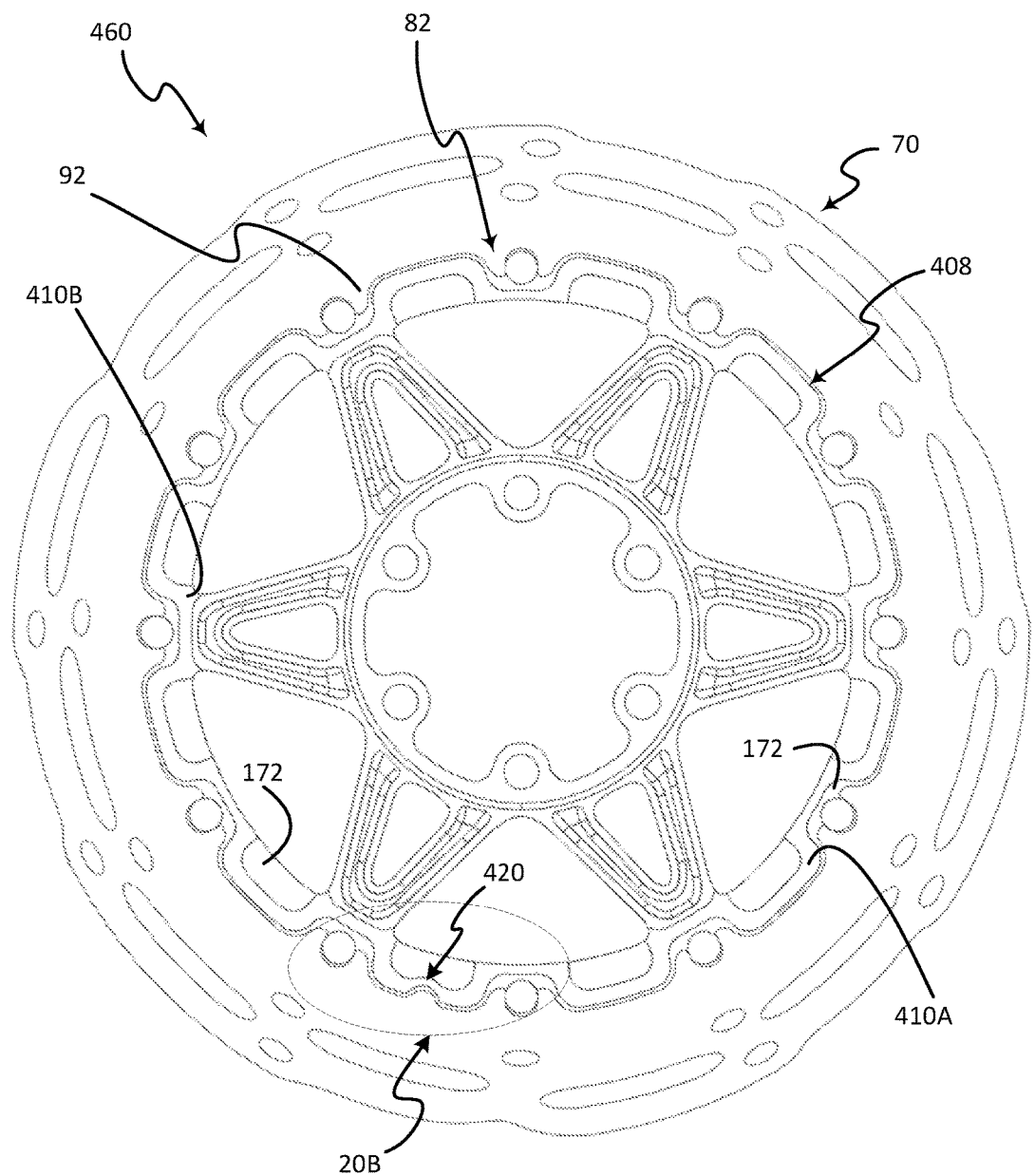
FIG. 20A shows a front or first side plan view of the brake rotor of FIG. 19A with the second cooling body removed.
Figure 20B:
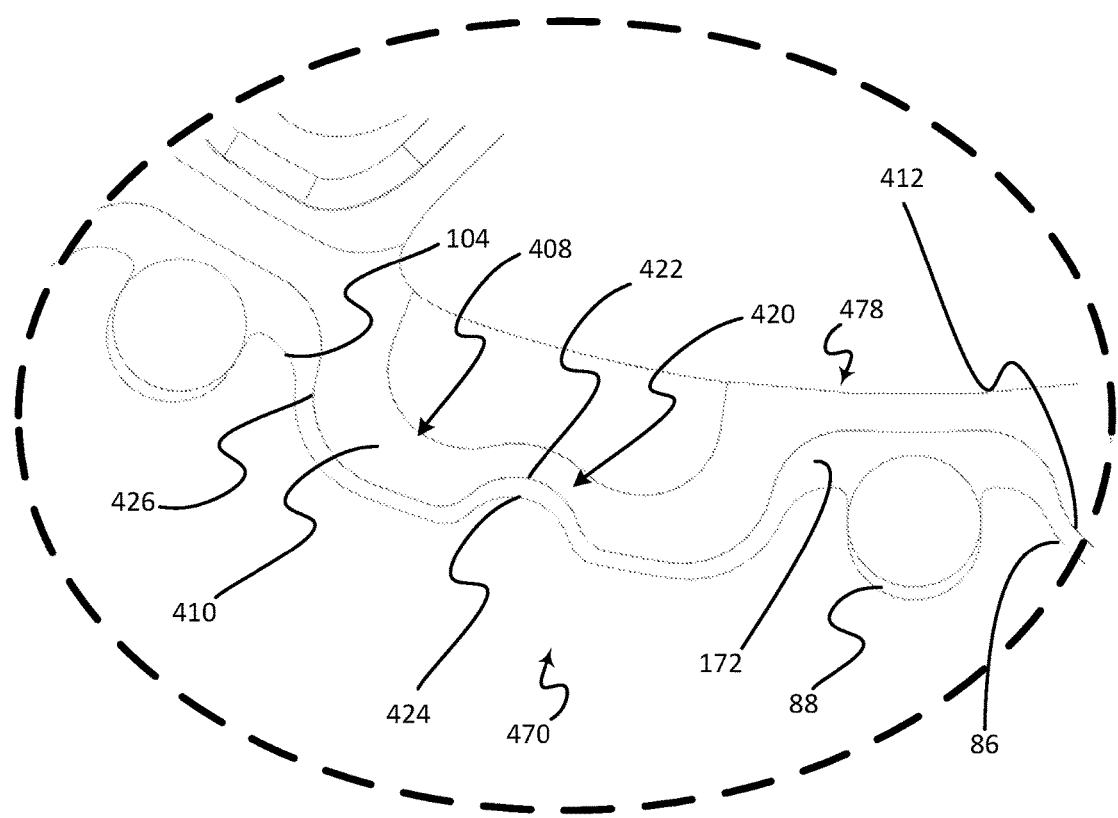
FIG. 20B shows an expanded view of the indicated section the brake rotor of FIG. 20A.
Figure 21:
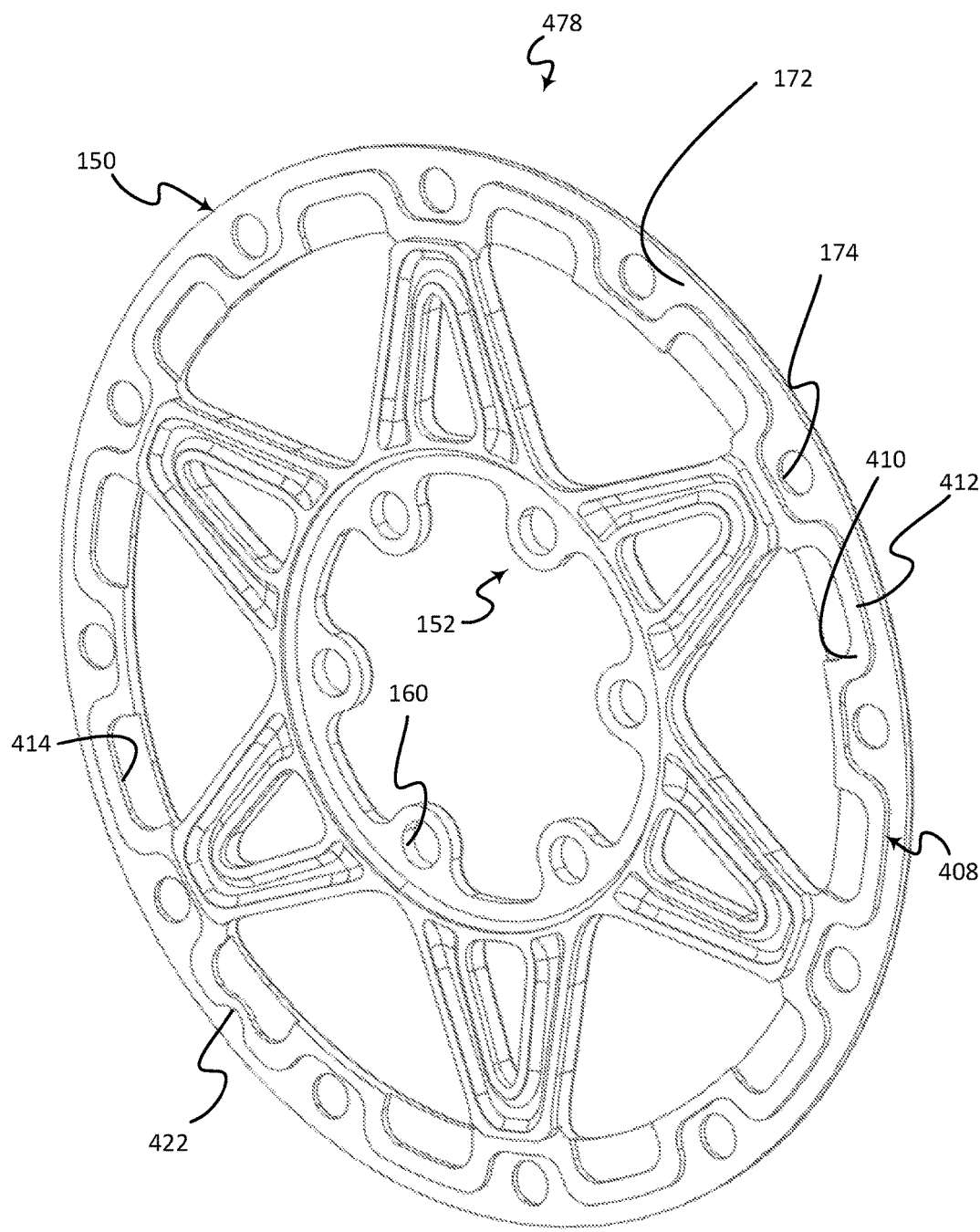
FIG. 21 shows a front or first side perspective view of the carrier of the brake rotor of FIG. 19A.
Figure 22:
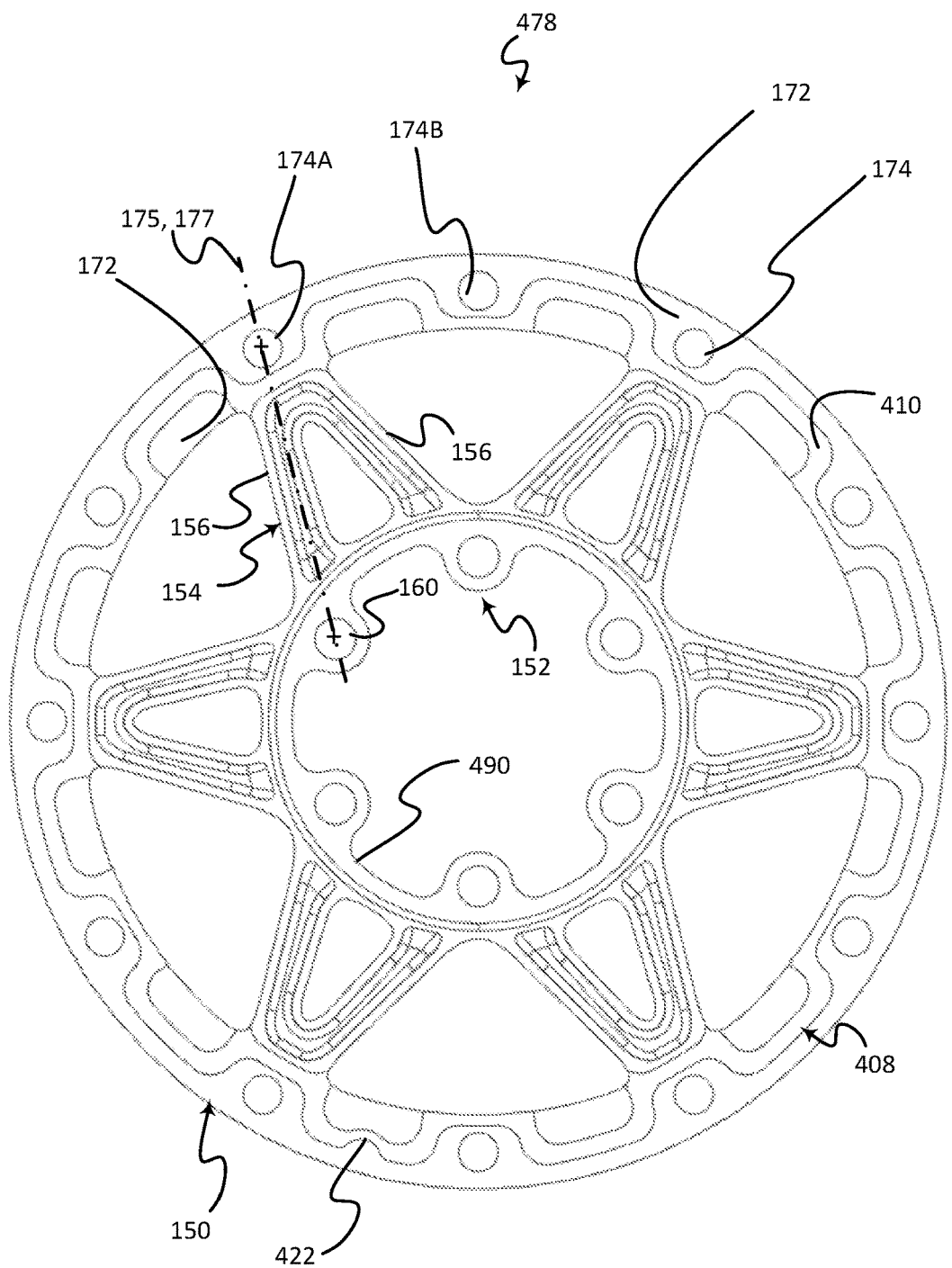
FIG. 22 shows a front or first side plan view of the carrier of the brake rotor of FIG. 19A.

With reference to FIGS. 6 and 11-12B, the carrier 78 in this example has an outer annular or circular ring or first cooling body, hereinafter referred to as the cooling body 150. The carrier 78 also has a coupling region or hub mount, hereinafter referred to as coupling region 152, joined to the cooling body 150 and having a plurality of legs, or bifurcated spokes 154. Each bifurcated spoke 154 has a radial outer end joined to the cooling body 150. Each bifurcated spoke 154 also has a pair of spoke arms 156 that, from a common radial outer end, extend in a radial inward direction but not directly toward the center of the carrier 78. Instead, each spoke arm 156 of a bifurcated spoke 154 angles away from the other and the radial inner end is joined with the inner end of a spoke arm of an adjacent bifurcated spoke. Each such joint forms a mounting portion 158 of the coupling region 152. Each mounting portion 158 includes a mounting hole 160 that is formed therethrough. The configuration of the mounting portions 158 and/or mounting holes 160 can vary but in this example is designed to mate with and mount the brake rotor to a hub on the front wheel 28 of the bicycle 20. An alternate coupling portion 152 is illustrated in FIG. 18 with a central hub 307 and a mounting interface 310, such as a splined interface, that may be coupled with a corresponding interface of a wheel to transfer the braking forces applied to the friction region 74 of the brake rotor 60 to the wheel.

The disclosed carrier 78 has a six bolt pattern with six bifurcated spokes 154, twelve spoke arms 156, six mounting portions 158 and six mounting holes 160. Other bolt patterns are certainly possible. Other coupling region constructions are also possible as well. In one example, the bifurcated spokes may be replaced by more conventional single spoke arms. In another example, the coupling region may define a single splined mounting arrangement at the center of the carrier for attaching the carrier to a wheel. In another example, the carrier can have a closed body configuration instead of an open ring body and spoke configuration, if desired. In any example, the coupling region is designed to mount the carrier, and thus the brake rotor to the wheel of the bicycle or other vehicle. The coupling region is configured for transmitting a braking load between the brake body and the coupling region, and thus the wheel. The braking load is a result of a braking force applied to the friction region on the brake body, as noted below when describing the operation of the brake rotor.

Figures 12A, 12B:
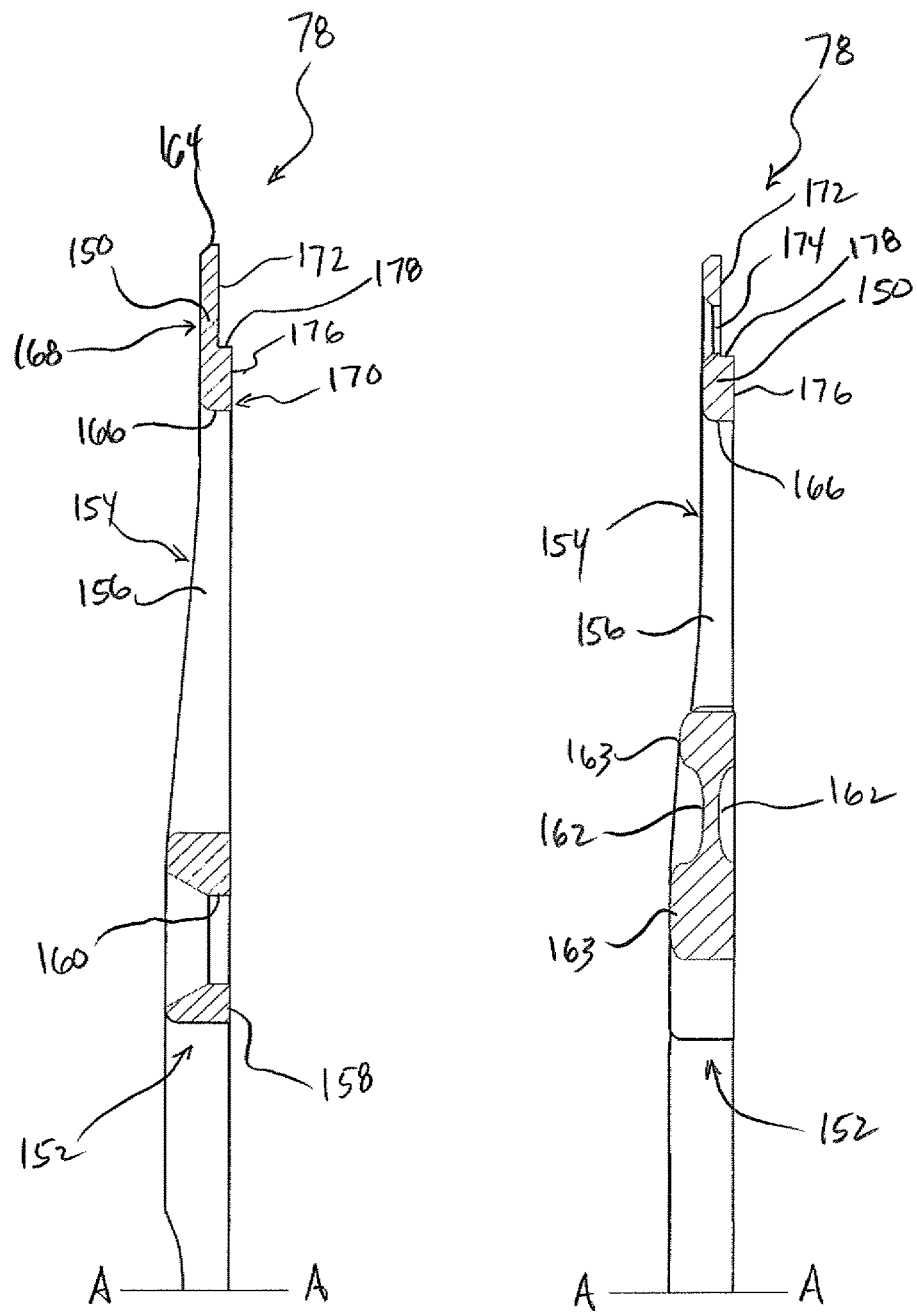
FIG. 12A shows a cross-section of portions of the carrier taken along line 12A-12A in FIG. 11.
FIG. 12B shows a cross-section of portions of the carrier taken along line 12B-12B in FIG. 11.

As shown in FIGS. 12A and 12B, the coupling region 152 may also have a construction that is configured to impart strength and rigidity to the carrier 78. In the disclosed example, the spoke arms 156 each have a non-flat construction. Each spoke arm 156 has a cavity 162 defined by a concave surface on a front side and a back side and thus has a concave cavity on both sides flanked by adjacent ribs 163. The coupling region 152 can also be thicker radially inward toward the center of the carrier 78 nearer the mounting portions 158 and can be thinner radially outward nearer the cooling body 150. The spoke arms 156 or bifurcated spokes 154 can also be wider along portions of their length, such as nearer the cooling body 150 as in this example. The configuration of the carrier 78 can vary. For example, the carrier 78 can have a corrugated coupling region and/or ring body, one or more flat surfaces, cooling ribs, cooling fins, weight reduction and/or cooling slots and holes, and/or other such features. Other configurations are certainly possible as well.

Figure 11:
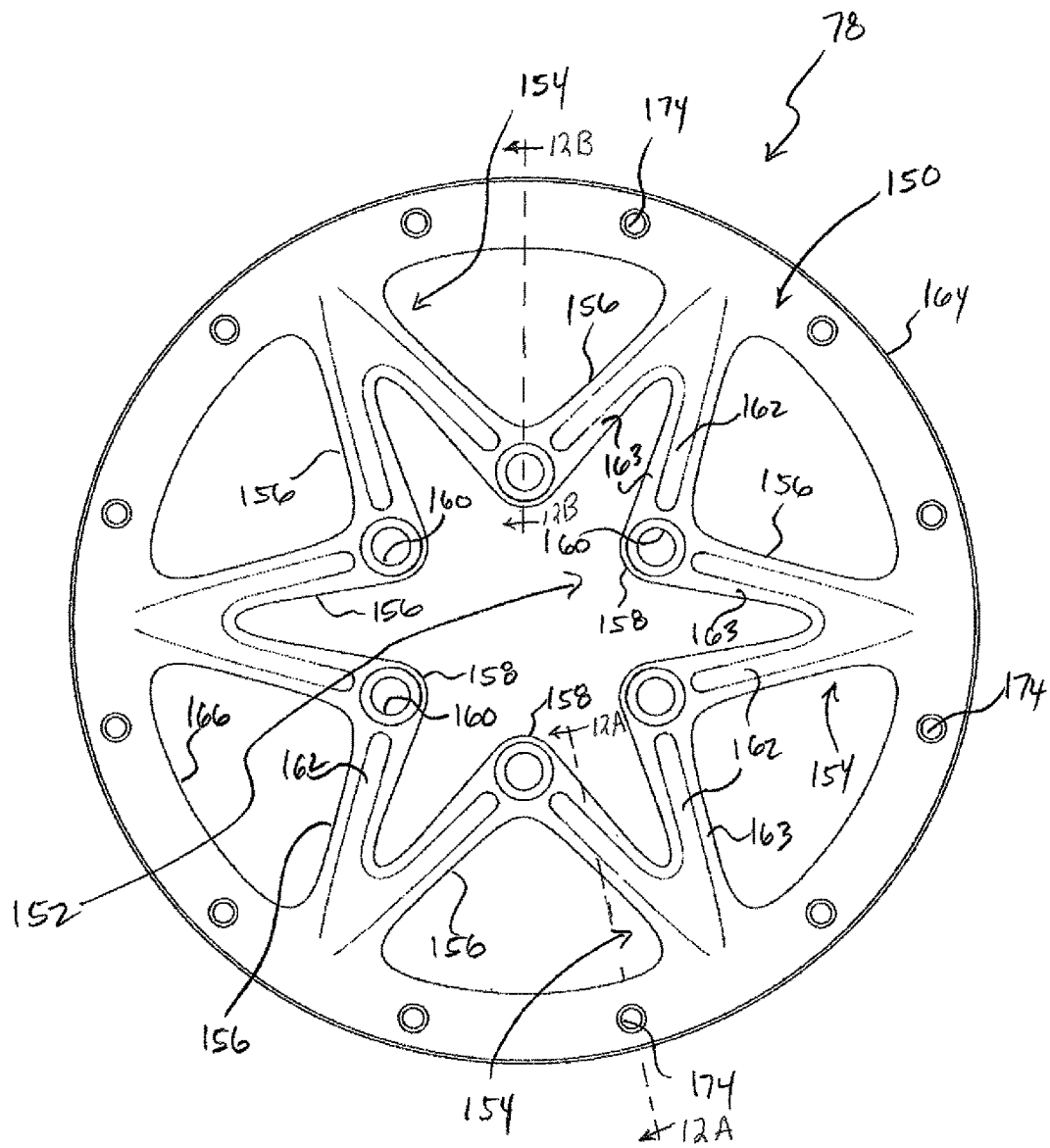
FIG. 11 shows a front or first side plan view of one example of a carrier part of the brake rotor of FIG. 2.

As shown in FIGS. 6 and 11, the cooling body 150 of the carrier 78 also has a radial outer edge 164 and a radial inner edge 166. The cooling body 150 also has an axial front facing side 168 and an axial rear facing side 170 (see FIGS. 12A and 12B). In this example, at least a portion of the rear facing side 170 can be substantially flat or planar. That portion of the rear facing side 170 on the cooling body 150 can define a circumferentially continuous first contact section 172 of the heat sink 72 or the carrier 78. The first contact section 172 is configured to contact a portion of the brake body 70 in the assembled brake rotor 60 as described below. In other examples, the rear facing side 170 can be configured to form a plurality of the first contact sections on the cooling body 150. This can be achieved using a radially or circumferentially segmented or discontinuous ring body or by providing protruding landings or bosses on the rear facing side 170. The first contact section 172 in this example is a radially outward circumferential section of the cooling body 150 on the rear facing side 170.

In this example, the bifurcated spokes 154 extend inward from the radial inner edge 166 of the cooling body 150. A plurality of mounting holes 174 are provided axially through the cooling body 150. The number of mounting holes 174 coincides with the number of attachment features or slots 88 in the brake body 70 for reasons described below. The outer edge 164 of the cooling body 150 in this example is circular and thus gives the carrier 78 an overall circular shape at its radial outermost extent. The shape of the outer edge 164, however, can be something other than circular, as long as the carrier 78 can mate with the brake body 70 and/or the second cooling body 80 to assemble the brake rotor 60, as described below.

In this example, another portion of the rear facing side 170, also shown in FIGS. 12A and 12B, can also be substantially flat or planar, but can be out of plane with the first contact section 172. That portion of the rear facing side 170 on the cooling body 150 can define a circumferentially continuous first mating section 176 of the heat sink 72, the cooling body 150, or the carrier 78. The first mating section 176 is configured to contact a portion of the second cooling body 80 in the assembled brake rotor 60 as described below. In other examples, the rear facing side 170 can be configured to form a plurality of the first mating sections on the cooling body 150 in the same manner described above for the first contact sections. The first mating section 176 in this example is a radially inward circumferential section of the cooling body 150 on the rear facing side 170 and is disposed inward of the first contact section 172. The cooling body 150 between the front and rear facing sides 168, 170 at the first mating section 176 is thicker than the cooling body between the first and second facing sides at the first contact section 172. The first mating section 176 is out of plane in a rearward axial direction relative to the first contact section 172. An annular, outward facing step surface 178 transitions between the two sections, as shown in FIGS. 12A and 12B.

In one example, the carrier 78, or at least part of the carrier, can be designed to form at least part of the cooling element or heat sink 72. Thus, the carrier 78, or at least the cooling body 150, can be formed of a second material, which may be considered to be a heat dissipation material as compared to the first material of the brake body 70. In one example, the entire carrier 78, including the coupling region 152 and the ring or cooling body 150, can be formed of aluminum or an aluminum alloy material. Thus, the entire carrier can be considered as the cooling body. The second material in this example should have good heat sink properties, such as with respect to specific heat and thermal conductivity. The heat sink characteristics or properties of the second material should be superior in comparison to the first material of the brake body 70. In other words, the carrier material in this example should have specific heat and thermal conductivity that are greater than the first or brake body material for best heat sink functionality. Aluminum alloys may be well suited as the carrier material because the carrier can be light weight, have high strength, and provide good thermal properties. However, other heat sink materials such as copper and copper alloys also have excellent thermal properties but would add weight to the brake rotor 60. Pure aluminum, a variety of aluminum alloys, copper, copper alloys, ceramics, or other composites or alloys are all certainly possible options for the carrier material, as are other materials, if the carrier is to provide all or part of the heat sink functionality in the brake rotor 60.

With reference to FIGS. 6, 13, and 14, the second cooling body 80 in this example is annular or has a circular ring shape. The shape of the second cooling body 80 can vary widely from this example, however. One purpose of the second cooling body 80 is to aid in assembling the brake rotor 60, as described below. The second cooling body 80 in this example has a radial outermost edge 180 and a radial innermost edge 182. The second cooling body 80 also has an axial front face 184 and an opposite axial rear face 186. In this example, at least the front face 184, or a portion thereof, can be substantially flat or planar. That portion of the front face 184 can define a circumferentially continuous second contact section 188 on the heat sink 72 or the second cooling body 80 that is configured to contact a portion of the brake body 70 in the assembled brake rotor 60 as described below. In other examples, the front face 184 can be configured to form a plurality of the second contact sections on the second cooling body 80. This can be done using a radially or circumferentially segmented or discontinuous body or by providing protruding landings or bosses on the front face 184. The second contact section 188 in this example is a radially outward circumferential section of the second cooling body 80 on the front face 184.

In this example, another portion of the front face 184 (also shown in FIGS. 14 and 15B) can also be substantially flat or planar and co-planar with the second contact section 188. That portion of the front face 184 on the second cooling body 80 can define a circumferentially continuous second first mating section 190 of the heat sink 72 or the second cooling body 80. The second mating section 190 is configured to contact a portion of the carrier 78 or the cooling body 150 in the assembled brake rotor 60 as described below. In other examples, the front face 184 can be configured to form a plurality of the second mating sections on the second cooling body 80 in the same manner described above for the first and second contact sections. The second mating section 190 in this example is a radially inward circumferential section of the second cooling body 80 on the front face 184 and is disposed inward of the second contact section 188.

In alternate examples, the axial front and rear facing sides 168, 170 of the cooling body 150 on the carrier 78 can both be planar or can both be non-planar. The first contact section 172 and the first mating section 176 can lie in the same plane or can lie out of plane but with the first mating section 176 offset toward the front side. Also, one or both of the front and rear faces 184, 186 of the second cooling body 80 can also be non-planar or only one may be planar. The second contact section 188 and the second mating section 190 can lie in different planes and can be offset in either the front or rear direction.

In the disclosed example, the second cooling body 80 also has a plurality of fastener holes 192 formed axially through the body. The number of the holes 192 again corresponds to the number of slots 88 in the brake body 70 and the mounting holes 174 in the carrier to facilitate assembly of the brake rotor as described below.

Another purpose of the second cooling body 80 in this example may be to form all of the heat sink 72, or at least part of the heat sink in combination with the carrier 78 or the cooling body 150 of the carrier. Thus, the second cooling body 80 can be formed of a third material, which may be considered to be a heat dissipation material as compared to the first material of the brake body 70. In one example, the second cooling body 80 can be formed of aluminum or an aluminum alloy material. The third material in this example should also have good heat sink properties, such as with respect to specific heat and thermal conductivity. The heat sink characteristics or properties of the third material should therefore have specific heat and thermal conductivity that are greater than the first or brake body material for best heat sink functionality. Aluminum alloys may be well suited as the second cooling body material because the second cooling body can be light weight, have high strength, and provide good thermal properties. However, as with the carrier 78 or the cooling body 150, pure aluminum, a variety of aluminum alloys, copper, copper alloys, ceramics, or other composites or alloys are all certainly possible options for the second cooling body material, if the second cooling body is to provide all or part of the heat sink functionality in the brake rotor 60. As noted above, the second and third material can be the same material or can be substantially the same material with similar specific heat and thermal conductivity properties.

Figure 15C:
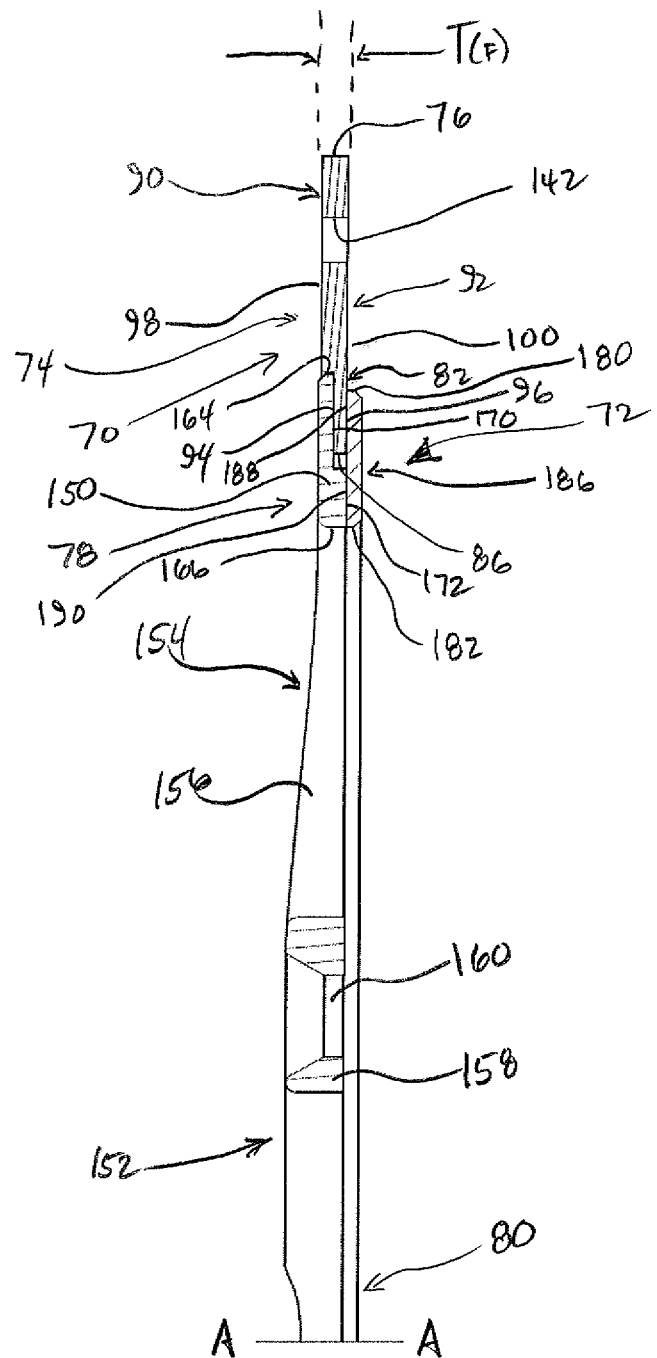
FIG. 15C shows a cross-section of the brake rotor taken along line 15C-15C in FIG. 3.

The assembled brake rotor 60 is now described with reference to FIGS. 2-6 and 15A-15C and to the foregoing descriptions of the brake body 70, carrier 78, and second cooling body 80. In this example, the carrier 78 is positioned concentric with the brake body 70 over the central opening 84 on the first axial surface 90. At least the coupling region 152 and the first mating section 176 of the carrier 78 may be disposed within the central opening 84 in the brake body 70. The radial outer edge 164 of the cooling body 150 faces and is seated adjacent and radially inward of the axial shoulder 102. The first contact section 172 on the rear facing side 170 of the cooling body 150 is borne against the first axial contact surface 94 of the heat dissipation region 74 on the brake body 70. The mounting holes 174 on the carrier 78 are aligned with the slots 88 on the brake body 70, as shown in FIGS. 15A and 15B. The second cooling body 80 is positioned concentric with the brake body 70 on the second axial surface 92. At least the second mating section 190 of the second cooling body 80 may be disposed radially within the central opening 84 of the brake body 70. The second contact section 188 on the front face 184 of the second cooling body 80 is borne against the second axial contact surface 96 of the heat dissipation region 74 on the brake body 70. The fastener holes 192 in the second cooling body 80 are aligned with the slots 88 in the heat dissipation region and the mounting holes 174 on the carrier, also as shown in FIGS. 15A and 15B.

As best illustrated in FIGS. 6, 15A, and 15B, fasteners 194 can then be used to secure the components together. In one example, the fasteners 194 can be stainless steel rivets. However, other fastener type, fastener materials, and/or fastening techniques may be utilized, if suitable and desired, to assemble the brake rotor 60. In the assembled brake rotor 60, part of the brake body 70 is captured or sandwiched between portions of the carrier 78 and portions of the second cooling body 80. More specifically, the first and second axial contact surfaces 94, 96 on the attachment portion or heat dissipation region 74 of the brake body 70 are in contact with and captured between the first contact section 172 of the carrier and the second contact section 188 of the second cooling body. Portions of the carrier 78 and second cooling body 80 are in direct contact with one another in a mating region that is radially inward of the heat dissipation region 74 and its inner periphery 86. More specifically, the first mating section 176 on the carrier 78 and the second mating section 190 on the second cooling body are borne against one another in the mating region, as depicted in FIGS. 15B and 15C.

The combination of the carrier 78, or the cooling body 150, and second cooling body 80 creates a sizable cooling element or heat sink 72 that is directly coupled to the brake body 70. In this example, at least a portion of the heat sink 72, i.e., the cooling body 150 of the carrier 78, is in contact with the first axial contact surface 94 around the brake body 70 for 360 degrees of the circumference of the heat dissipation region 74. This is because both the first axial contact surface 94 and/or the heat dissipation region 74 and the first contact section 172 of the carrier 78 are circumferentially continuous and substantially planar. Likewise, at least a portion of the heat sink 72, i.e., the second cooling body 80, is in contact with the second axial contact surface 96 around the brake body 70 for 360 degrees of the circumference of the heat dissipation region 74. This is again because the second axial contact surface 96 and/or the heat dissipation region 74 and the second contact section 188 are circumferentially continuous and substantially planar.

In other examples, the heat sink 72, i.e., the carrier 78, the second cooling body 80, or both, may be in contact with the first axial contact surface 94, the second axial contact surface 96, or both, over less than 360 degrees around the brake body but for at least a majority of the circumference of the heat dissipation region. For example, one of the brake bodies 110 or 120 could be used, which have segmented or discontinuous heat dissipation regions. The brake body 110 of FIG. 9 has twelve segments 114 of the heat dissipation region 112 and twelve gaps 118. Each of the twelve gaps in one example is 5 degrees of the circumference of the brake body 110. Thus, the heat sink 72 contacts the heat dissipation region 112 over 300 degrees of the circumference of the brake body 110. The brake body 120 has four elongate segments 124 in the heat dissipation region 122 and has four 5 degree gaps separating the segments. Thus, the heat sink 72 contacts the heat dissipation region 122 over 340 degrees of the circumference of the brake body 120. In either example, the heat sink contact around the brake body would be over a majority of the circumference, though less than 360 degrees, and still be quite effective in dissipating heat from the brake body through the heat sink. In other examples, combinations of the heat dissipation region contact surfaces and the cooling body and second cooling body contact sections may yield 360 heat sink contact around the brake body though neither the cooling body nor the second cooling body do so alone. In still another example, the heat sink contact with the brake body may amount to 300 degrees or more of circumferential contact around the brake body. In yet another example, the heat sink contact with the brake body may be substantially all, but not entirely all, of the circumference around the brake body. Substantially all would mean at least one break one location where there is no circumferential contact between the heat sink and brake body.

Figure 16:
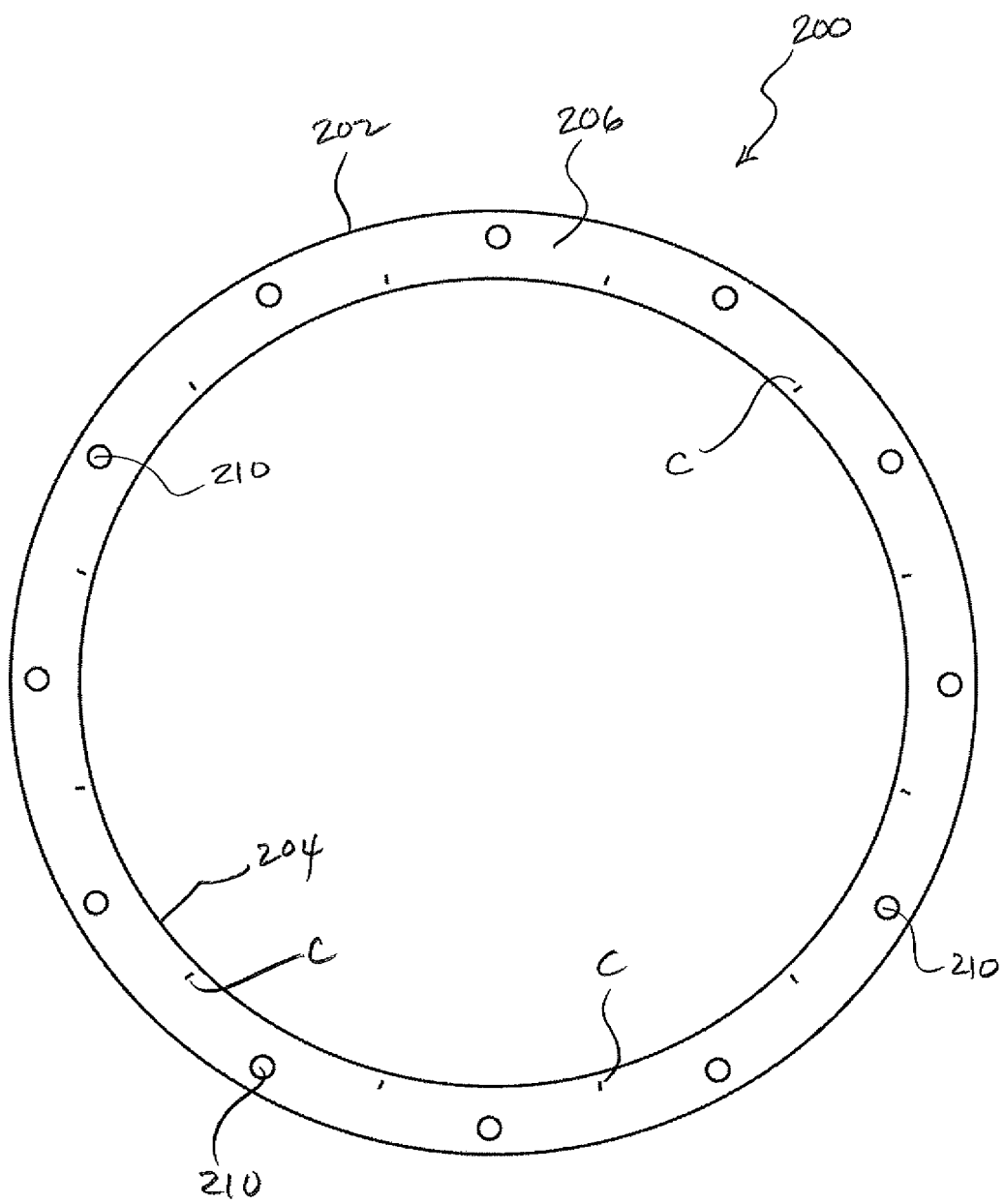
FIG. 16 shows a front or first side plan view of another example of a second cooling body part that can be used on the brake rotor or FIG. 2.
Figure 17A:
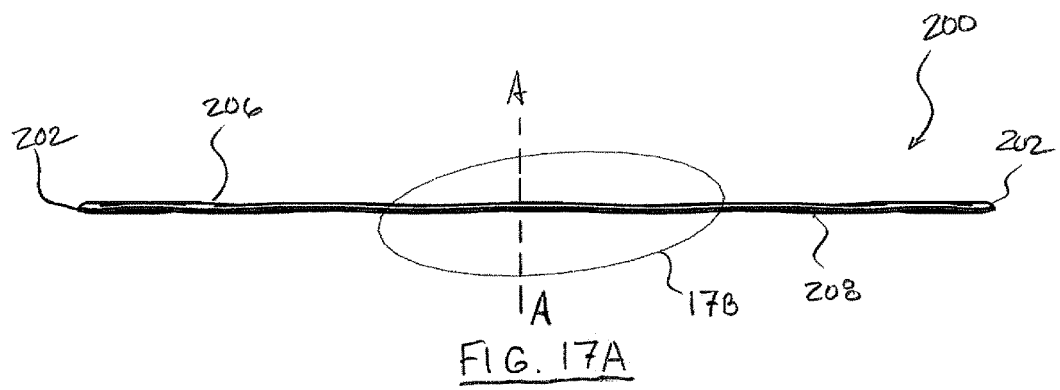
FIG. 17A shows an end or edge view of the second cooling body of FIG. 16.
Figure 17B:
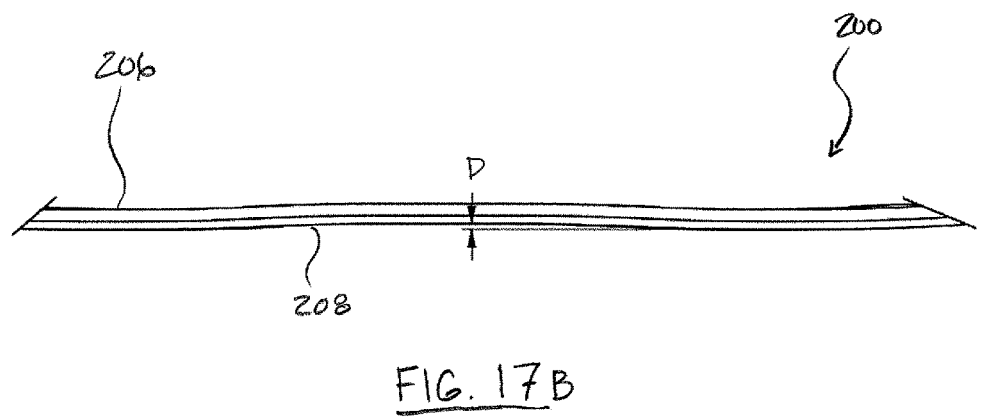
FIG. 17B shows an enlarged portion of the second cooling body taken from circle 17B in FIG. 17A.

FIGS. 16, 17A, and 17B show one alternate example of a portion of the heat sink where the heat sink portion is corrugated or otherwise non-planar or non-flat prior to assembly. In this example, a second cooling body 200 has contact surfaces that are not flat or planar before assembly. These surfaces, however, can be configured to become flat against the contact surfaces of the brake body when the brake rotor is assembled. In this example, the second cooling body 200 is depicted in FIGS. 16 and 17A as an annular body or ring shape. The second cooling body 200 has a radial outermost edge 202, a radial innermost edge 204, a front face 206, a rear face 208, and fastener holes 210 through the body, similar to the second cooling body 80 described previously.

However, in this example, the second cooling body 200 is not completely flat or planar, as can be seen in FIGS. 17A and 17B. The second cooling body 200 can include a plurality of discreet or subtle corrugations, waves, or non-planar features around the body in a circumferential direction. In the example shown in FIG. 16, radial extending shade lines C are shown spaced circumferentially between and among the fastener holes 210 around the annular body. The lines C may represent a curvature transition line to indicate a subtle convex or concave curve in the second cooling body 200 at the location of each line. As shown in FIG. 17B, this subtle curve can result in a portion of the cooling body 200 being out of plane by a dimension or gap D relative to adjacent portions of the cooling body. The location, number, and out of plane dimension D can vary.

The second cooling body 200 can be assembled via the fasteners 194 to complete a brake rotor that is otherwise identical to the brake rotor 60. When assembled, the corrugated second cooling body 200 can become flat under compression applied by the fasteners 194. The forcibly flattened second cooling body 200 can thus apply or impart a preload against the fasteners 194 and between the front face 206 on the second cooling body 200 and the second axial contact surface 94 on the heat dissipation region 74 of the brake body 70. The preload can aid in preventing the fasteners 194 from inadvertently backing out. The preload can also aid in increasing and maintaining thermal surface contact between the second cooling body 200 and the carrier 78 in the mating region and between the second cooling body and the brake body 70 in the heat dissipation region 74. This may be particularly useful as these parts thermally grow and deform under heavy or extreme braking conditions during use.

The disclosed second cooling bodies can vary in configuration and construction, if desired, from the simple annular bodies disclosed above. The second cooling body can have a shape other than a circular ring or annular shape. The thickness of the second cooling body can vary over portions of the second cooling body in a radial direction, a circumferential direction, or both. As described, the second cooling body can be corrugated, non-planar, slightly conical, wavy, or otherwise non-flat in a pre-assembled condition. Such non-flat configurations can thus render the second contact section or sections of the front face to be non-flat as well, which can become flat when secured by the fasteners. The second cooling body can instead be a flat ring shape, as in the disclosed example of FIGS. 13 and 14. The second cooling body can also include other features and characteristics to reduce weight, reduce material usage, improve heat conduction, absorption, and/or dissipation, and the like. For example, the second cooling body can include cooling ribs, fins, additional holes, added slots, or other such features.

In other examples, it is possible that the first contact section or sections on the carrier can also be non-flat in the same manner prior to assembling the brake rotor. Thus, the ring shaped cooling body of the carrier may have a subtle non-flat, corrugated, non-planar, or wavy construction as well. In still other examples, either or both of the cooling body and second cooling body can be so constructed. However, as with the second cooling body, the carrier cooling body can become flat or substantially planar when the brake rotor is assembled. It is further possible to fabricate the brake body such that the first and/or second axial contact surfaces 94, 96 on the heat dissipation region 82 may also be non-flat, corrugated, non-planar, wavy, or the like. These contact surfaces can be so constructed whether or not the aforementioned carrier and second cooling body are so constructed.

In the disclosed example, the brake body 70 includes twelve slots 88. The carrier correspondingly has twelve mounting holes 174 and the second cooling body correspondingly has twelve fastener holes 192. Likewise, the brake rotor has twelve fasteners 194, for example rivets, received through the mounting holes 174, slots 88, and fastener holes 192 to assemble the rotor. The various slots and holes are arranged in a circumferential alignment with one another and are spaced equidistant from one another around the brake rotor. However, any number more or less than twelve, and many different arrangements of the fasteners, holes, and slots may be used in order to assemble the brake rotor 60.

FIGS. 19A-22 illustrate another embodiment of a brake rotor 460. The brake rotor 460 includes a brake body 470, similar to the previously described brake body 70 in material and structure, but may include different structure and/or features. The brake body 470 is formed of a first material and having a generally annular shape with a radially outer friction region and a radially inner heat dissipation region, the heat dissipation region having a first axial contact surface. The brake rotor 460 also includes a carrier 478, similar to previously described carriers 78 in material and structure, but may include different structure or features. The carrier 478 has a coupling region, the carrier 478 is configured for transmitting a braking load between the brake body and the coupling region. The carrier 478 includes a cooling body 150 formed of a second material and coupled to the first axial contact surface. The cooling body 150 is in contact with the first axial contact surface around the brake body for a majority of a circumference of the heat dissipation region. The second material has a higher thermal conductivity than the first material.

In this embodiment, the cooling body 150 includes a protrusion 408 configured for heat transfer from the cooling body 150. The protrusion extends a distance 411 away from the first contact section 172 of the cooling body 150 of the carrier 478. In an embodiment, the distance 411 is equal to a width of the brake body 470 at the radially inner heat dissipation region. The protrusion 408 may also include a radially outer surface or edge 412 and/or a radially inner surface or edge 414. The added surface area of the radially inner surface 412 and/or radially outer surface 414 may provide for additional heat dissipation to the surrounding environment. The embodiment may include a second cooling body 80.

In an embodiment, the brake rotor 460 may be constructed such that the radially outer surface or edge 412 is disposed a distance away from the inner periphery 86 of the brake body 70, resulting in a gap therebetween. In an embodiment, the gap may exist throughout the entirety of the protrusion 408 around the circumference of the carrier 478. Configuring the radially outer surface or edge 412 closer to the inner periphery 86 of the brake body 70, thus minimizing the spaced apart distance of the gap, may allow for more heat transfer from the brake body 70 to the cooling body 150 through the proximal location of the inner periphery 86 of the brake body 70 and the radially outer surface or edge 412 of the protrusion 408. In an embodiment, the brake rotor 460 is configured such that the inner periphery 86 of the brake body 70 makes contact with the radially outer surface or edge 412 of the protrusion 408. This contact may be continuous about the circumference of the inner periphery 86 of the brake body 70 and the radially outer surface or edge 412 of the protrusion 408, or intermittent about such a circumference. Also, the inner periphery 86 of the brake body 70 and the radially outer surface or edge 412 of the protrusion 408 may be configured such that forces applied to the brake body 70 may be transferred to the carrier 478 in the absence of fasteners 194. For example, taller segments 104 of the inner periphery 86 of the brake body 70 may be configured to abut and contact a receiving surface 426 and/or zone of the radially outer surface or edge 412 of the protrusion 408. This internal contact of the brake rotor 460, 60 may be configured to occur during the transfer of forces applied to the brake body 70 to the carrier 478, 78.

The carrier 478 may be configured with spoke arms 156 aligned between mounting holes 174 for the brake body 470 and hub mounting holes 160 of the carrier 478. For example, a mounting hole 174A for the brake body 470 may have one or more spoke arms 156 aligned from the mounting hole 174A to one or more hub mounting holes 160. In an embodiment, the mounting hole 174A for the brake body has two spoke arms 156 connecting the mounting hole 174A to two separate hub mounting holes 160. Also, the coupling portion 152 of the carrier 478 may include an inner ring 490 connecting the hub mounting holes 160 of the carrier 478. As such, a triangular structure may be formed between the mounting hole 174A and the two hub mounting holes 160. For singular alignment of the spoke arms 156 to the mounting hole 174A, a line 175 defining the spoke arm 156 intersects the mounting hole 174. For alignment between the mounting hole 174A and the hub mounting hole 160, the spoke arm 156 configured to run therebetween contains a line 177 from the center of the mounting hole 174A and the hub mounting hole 160. The carrier 478 may also include mounting holes 174B that are not aligned with the spoke arms 156. In an embodiment, the carrier 478 may include a pattern of alternating configuration of mounting holes 174A that are aligned with spoke arms 156 and mounting holes 174B that are not aligned with spoke arms 156.

The protrusion 408 may include a surface 410 configured to contact the second cooling body 80, and transfer heat between the first cooling body 150 and the second cooling body 80. The protrusion surface 410 may be an axial surface configured to abut and/or otherwise be in contact with the front face 184 of the second cooling body 80. The surface 410 may be a continuous surface having a consistent, or substantially consistent, distance 411 away from the first contact section 172 of the cooling body 150 about the entire circumference of the carrier 478. The protrusion 408 may be in contact with the second cooling body for a majority of the circumference around the second cooling body 80. In an embodiment, the protrusion 408 is in contact with the second cooling body 80 for substantially the entire circumference around the second cooling body 80, with only minimal lengths of the circumference not contacting. In another embodiment the protrusion 408 is in contact with the second cooling body for the entire 360 degrees of circumference around the second cooling body 80. The protrusion 408 may be made of the same or different material of the rest of the first cooling body 150. For example, the protrusion may be formed of a material that has a higher heat conductivity than other material of the first cooling body 150. The protrusion 408 may be formed of a rigid material, and thus be a rigid protrusion. In an embodiment, the protrusion 408 is formed with the first cooling body 150 of the carrier 478 as a one piece unitary construction. Also, in an embodiment, the entirety of the carrier 478, including the protrusion 408 is formed as a one piece unitary construction. For example, the entirety of the carrier, including the protrusion 408 may be formed through machining, casting, molding, or other processes as a one piece unitary construction of a same material.

The brake rotor 460 may include an aligning element 420. The aligning element 420 may circumferentially, or rotationally, align the brake body 470 and the carrier 478. The aligning element 420 may include features on both the brake body 470 and the carrier 478. Alignment features of the aligning element 420 may correspond to generate an alignment of the brake body 470 to the carrier 478. For example, the protrusion 408 may include a profile in the radially outer surface or edge 412 that includes a specifically shaped feature 422, for example a curved surface, in the profile. The inner periphery 86 of the brake body 470 may also include a second specifically shaped feature 424 that is shaped to correspond to the protrusion feature 422 such that the alignment of these two alignment features 422, 424 during construction of the brake rotor 460 causes a particular rotational alignment of the brake body 470 relative to the carrier 478 about the rotational axis A of the brake rotor 460.

In another embodiment, a thermally conductive paste or other thermal conductivity aiding material may be used between the contact surfaces of the first cooling body 150, the second cooling body 80, and/or the brake body 70. The inclusion of such a paste or other material may increase the heat transfer characteristics of the interface between the cooling bodies 80, 150 and facilitates the transfer of heat therebetween. The inclusion of such a paste or other material is considered contact between the respective components as is described in embodiments herein.

The disclosed construction of the front brake rotor 60 is equally applicable to the rear brake rotor 62, as noted above. The brake rotors disclosed herein are heat dissipating rotors. In the examples shown and described, the brake rotor 60 has a stainless steel brake body, an aluminum alloy heat sink, i.e., an aluminum alloy carrier and an aluminum alloy second cooling body, and stainless steel rivets. The brake body is in contact with the heat sink, i.e., both the carrier and the second cooling body at a heat dissipation region around a majority of a circumference of the brake body. This contact allows for and encourages heat transfer from the stainless steel brake body to the heat sink body or bodies. The slots 88 in the heat dissipation region 82 on the brake body 70 are configured and provided to permit relative radial expansion between the brake body and heat sink. As the brake body heats up and expands or grows relative to the heat sink, the slots 88 allow the rivets or fasteners 194 to move slightly in a radial direction relative to one another. The aluminum heat sink, i.e., the carrier and second cooling body act as a heat sink in transferring or conducting excess heat from the brake body to the heat sink. In the disclosed example, both the carrier and the second cooling body contact surfaces of the brake body and contact one another. Thus, both components can very effectively transfer heat from the brake body to the heat sink.

The disclosed heat dissipating brake rotors can be used as a lightweight component on bicycles to lower the operating temperatures in a disc brake system. Extreme braking condition may result from greater deceleration rates, steeper downhill gradients, and higher speeds. Braking friction under these conditions generates higher wattages, which results in higher brake component temperatures. Therefore, there is a need for the disclosed brake rotors, which can efficiently remove excess heat from the brake body of the braking system, hold a significant portion of the brake body generated heat, and release the heat to the surrounding environment through convection and radiation.

The disclosed heat sink can be fabricated from different suitable heat sink materials. Aluminum and aluminum alloys have high relative specific heat and thermal conductivity properties, which renders such materials particularly useful for heat sink applications. Aluminum and aluminum alloys are also relatively high strength materials, which renders them particularly useful for the brake rotors disclosed herein.

During use of the disclosed bicycle and brake rotors, a rider applies the brakes to control vehicle speed. The brake pads make contact with the friction region of the brake rotors, which, under heavy or extreme braking conditions, generates substantial friction in controlling the rotational speed of the brake rotors and thus the wheels. The friction at the friction region on the brake body converts the bicycle's kinetic energy into heat. A portion of the heat is transferred into the brake pads, but a greater portion of the heat is transferred into the brake body.

As the brake body heats up, its larger diameter grows through thermal expansion. The brake body attachment features or slots allow for radial movement of the rivets. Thus, the slots render the brake body unconstrained in the radial direction, allowing the brake body to thermally grow. This feature can aid in avoiding heat warping or deformation of the brake body that can otherwise occur in a conventional over-constrained round hole style rivet mount. Also, the aluminum alloy carrier and second cooling body are in contact with the brake body and function as a heat sink. The carrier and second cooling body absorb or conduct heat from the brake body through their mutual contact surfaces at the heat dissipation region. The aluminum alloy carrier and second cooling body can share, through their contact in the mating region, the temperature or heat of the brake body and can hold a portion of the heat. A portion of the heat can be dissipated or released through the external surface area of the carrier and second cooling body. Thus, the surface area of these parts can be designed to increase or maximize the surface area of the heat sink. This heat is transferred through convection and radiation to the surrounding air and environment.

When the rider releases the brakes, the brake system ceases to generate heat. However, the brake rotor, with its now elevated temperature, can continue to transfer heat to the surrounding environment, as well as to the heat sink. As time passes without the brakes being applied, the brake rotor continues to release heat, approaching the temperature of the surrounding environment until the next braking event.

One existing brake rotor design uses aluminum in the brake body itself in an attempt to dissipate heat more efficiently. However, it is the brake body that experiences the highest temperatures in a brake system. Testing has shown that the aluminum in the brake body can melt during heavy or extreme braking conditions. This melting of the aluminum brake body material deforms the brake body, compromises its strength, and contaminates the brake surface with molten aluminum. The disclosed brake rotors do not use aluminum in the brake body where the temperatures are the greatest, thus improving the rotor's resistance from melting, but achieve the advantages and benefits of using a high thermal conductivity material.

Another existing brake rotor design uses a stainless steel brake body with aluminum material attached on one side of the brake body and in between structural arms of a mounting hub. Adding the aluminum material reduced the contact surface area of the brake body, reduced the volume of aluminum in the proximity of the brake body, and therefore reduced the heat sink capabilities of the material with the brake body. In comparison, the disclosed brake rotors have aluminum heat sink contact on both sides of the brake body, can have a majority or 360 degree circumferential contact with the brake body but radially inward of the friction region, and have a much greater volume of aluminum in proximity to the brake body, all of which maximize the heat sink capabilities of the brake rotor design.

Both of the foregoing existing brake rotor designs also employ rivets that join the parts of the brake rotor through circular holes. The circular holes over-constrain the brake body, thus not allowing for thermal growth. The disclosed brake rotors improve upon this disadvantage by using slots in the brake body for receiving the rivets to assemble the brake rotor. The slots allow the brake body to thermally grow unconstrained, which greatly assist in avoiding in-use warping and permanent deformation of the brake body.

The disclosed brake rotors may be particularly well suited for use on mountain bicycles. However, the brake rotor may also be used on other at least partially human-powered vehicles such as on light weight road bikes, off-road bicycles, road bicycles, and electric motor assisted bikes. Braking applications above this size or weight range of vehicles could require design modifications to improve strength. Braking applications below this size or weight range of vehicles may not require the heat dissipation performance provided by the disclosed brake rotors.

The illustrations of the embodiments and examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of ordinary skill in the art upon reviewing the disclosure. Other embodiments may be utilized and derived from the disclosure, such that structural and logical substitutions and changes may be made without departing from the scope of the disclosure. Additionally, the illustrations are merely representational and may or may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the inventions or of what may be claimed, but rather as descriptions of features specific to particular embodiments of the inventions. Certain features that are described in this specification in the context of separate embodiments can also be implemented in combination in a single embodiment.

Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The claims are as follows:

1. A brake rotor for a bicycle, the brake rotor comprising:
   a brake body formed of a first material and having a generally annular shape with a radially outer friction region and a radially inner heat dissipation region, the heat dissipation region having a first axial contact surface;
   a carrier having a coupling region, the carrier configured for transmitting a braking load between the brake body and the coupling region, the carrier including a first cooling body formed of a second material and coupled to the first axial contact surface, the carrier being disposed at least partially within a central opening of the brake body, the carrier having a first contact section in contact with the first axial contact surface, and
   a second cooling body disposed at least partially radially overlying the central opening, the second cooling body having a second contact section in contact with a second axial contact surface of the heat dissipation region, the second axial contact surface facing opposite the first axial contact surface on the brake body, and wherein the heat dissipation region of the brake body is disposed between the first contact section and the second contact section,
   wherein the second material has a higher thermal conductivity than the first material and the first cooling body includes a protrusion formed therein and configured for heat transfer from the first cooling body comprising an axial surface configured to contact the second cooling body and transfer heat therebetween, and
   wherein the first cooling body is in contact with the first axial contact surface around the brake body for a majority of a circumference of the heat dissipation region.

2. A brake rotor according to claim 1, wherein the brake body comprises a first alignment feature, and the protrusion comprises a second alignment feature, the first and second alignment features corresponding to generate an alignment of the brake body to the carrier.

3. A brake rotor according to claim 2, wherein the alignment is a rotational alignment of the brake body relative to the carrier about a rotational axis of the brake rotor.

4. A brake rotor according to claim 1, wherein the first contact section, the second contact section, or a combination thereof are configured and arranged to contact the first axial contact surface, the second axial contact surface, or both, for 360 degrees around the circumference of the heat dissipation region.

5. A brake rotor according to claim 1, wherein the first cooling body is in contact with the first axial contact surface around the brake body for between 300 degrees and 360 degrees of the circumference of the heat dissipation region.

6. A brake rotor according to claim 1, wherein the first cooling body is in contact with the first axial contact surface around the brake body for 360 degrees of the circumference of the heat dissipation region.

7. A brake rotor according to claim 1, wherein the second material is aluminum or an aluminum alloy.

8. A brake rotor according to claim 1, wherein the first material is a stainless steel.

9. A brake rotor according to claim 1, wherein the braking load results from a braking force applied to the friction region.

10. A brake rotor according to claim 1, wherein the coupling region of the carrier is configured for mounting to a hub of a wheel of the bicycle.

11. A brake rotor according to claim 1, wherein at least a portion of the first cooling body of the carrier radially overlaps the heat dissipation region of the brake body.

12. A brake rotor for a bicycle, the brake rotor comprising:
    a brake body formed of a first material and having a generally annular shape with a first axial surface and a second axial surface opposite the first axial surface;
    a carrier formed of a second material and coupled to the brake body such that one or more first contact sections of a first cooling body of the carrier contact the first axial surface of the brake body, the cooling body including a protrusion formed of the second material; and a second cooling body formed of a third material and coupled to the brake body such that one or more second contact sections of the second cooling body contact the second axial surface of the brake body, the protrusion of the cooling body configured to contact the second cooling body to transfer heat therebetween, wherein at least one of the second material or the third material has a higher heat conductivity than the first material of the brake body.

13. A brake rotor according to claim 12, wherein the brake body further comprises:
a central opening;
an outer periphery;
an inner periphery facing radially inward around the central opening;
an attachment portion adjacent the inner periphery; and
a braking portion disposed radially outward of the attachment portion.

14. A brake rotor according to claim 13, wherein the attachment portion has a first thickness between the first axial surface and the second axial surface and the braking portion has a second thickness between the first axial surface and the second axial surface, the first thickness being less than the second thickness.

15. A brake rotor according to claim 14, wherein a second braking surface of the braking portion and a second contact surface of the attachment portion on the second axial surface are co-planar with one another, and wherein a first braking surface of the braking portion and a first contact surface of the attachment portion on the first axial surface are not co-planar with one another.

16. A brake rotor according to claim 15, wherein the one or more first contact sections of the carrier contact the attachment portion on the first axial surface of the brake body, the one or more second contact sections of the second cooling body contact the attachment portion on the second axial surface of the brake body.

17. The brake rotor according to claim 15, wherein the carrier and second cooling body contact one another in a mating region that is radially inward of an inner edge of the braking portion.

18. A brake rotor according to claim 15, wherein the carrier and second cooling body are joined to one another and to the brake body via fasteners through the attachment portion, the second cooling body, and the carrier.

19. A brake rotor according to claim 13, further comprising a plurality of attachment features formed into the inner periphery of the brake body, wherein the attachment portion is disposed between the one or more second contact sections and the one or more first contact sections, and wherein the second cooling body and the carrier are joined to one another and to the brake body by fasteners through the plurality of attachment features, whereby the plurality of attachment features are configured to permit relative radial expansion between the brake body and the second cooling body and carrier.

20. A brake rotor according to claim 12, wherein the brake body comprises a first alignment feature, and the protrusion comprises a second alignment feature, the first and second alignment features corresponding to generate an alignment of the brake body to the carrier.

21. A brake rotor according to claim 20, wherein the alignment is a rotational alignment of the brake body relative to the carrier about a rotational axis of the brake rotor.

22. A brake rotor according to claim 12, wherein the second material is aluminum or an aluminum alloy.

23. A brake rotor according to claim 12, wherein the third material is substantially the same as the second material.

24. A brake rotor according to claim 12, wherein the third material has a higher thermal conductivity than the second material.

25. A brake rotor according to claim 12, wherein the third material is aluminum, copper, or an alloy of aluminum and/or copper.

26. A brake rotor for a bicycle, the brake rotor comprising:
a brake body formed of a first material and having a generally annular shape, the brake body having a first axial surface, a second axial surface opposite the first axial surface, and an inner periphery that faces radially inward and extends circumferentially around the brake body;
a carrier formed of a second material and coupled to the brake body such that one or more first contact sections of a first cooling body of the carrier contact the first axial surface of the brake body, the cooling body including a protrusion;
a second cooling body formed of a third material and coupled to the brake body such that one or more second contact sections of the second cooling body contact the second axial surface of the brake body, the protrusion of the cooling body configured to contact the second cooling body for a majority of a circumference to transfer heat therebetween; and
a plurality of attachment features formed into the inner periphery of the brake body,
wherein the second cooling body and carrier are joined to one another and to the brake body by fasteners through the plurality of attachment features, whereby the plurality of attachment features are configured to permit relative radial expansion between the brake body and the second cooling body and carrier.

* * * * *